United States Patent
Chen et al.

(10) Patent No.: US 12,085,657 B2
(45) Date of Patent: Sep. 10, 2024

(54) TECHNIQUES TO DISAMBIGUATE ANGLE OF ARRIVAL

(71) Applicant: APPLE INC., Cupertino, CA (US)

(72) Inventors: Qiang Chen, Fremont, CA (US); Robert W. Brumley, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 450 days.

(21) Appl. No.: 17/339,868

(22) Filed: Jun. 4, 2021

(65) Prior Publication Data

US 2022/0390541 A1    Dec. 8, 2022

(51) Int. Cl.
  *G01S 3/48*    (2006.01)
  *G01S 3/04*    (2006.01)
  *G01S 5/04*    (2006.01)
  *H01Q 5/25*    (2015.01)

(52) U.S. Cl.
  CPC ............... *G01S 3/48* (2013.01); *G01S 3/043* (2013.01); *G01S 5/04* (2013.01); *H01Q 5/25* (2015.01)

(58) Field of Classification Search
  CPC .................................. H01Q 5/25; G01S 3/043
  USPC ....................................................... 455/456.1
  See application file for complete search history.

(56) References Cited

U.S. PATENT DOCUMENTS

| 10,386,447 B2 | 8/2019 | Badawy et al. | |
| 2014/0349671 A1* | 11/2014 | Lakhzouri | H04W 64/00 |
| | | | 455/456.1 |
| 2016/0202342 A1* | 7/2016 | Collins | G01S 5/02521 |
| | | | 455/456.2 |
| 2016/0334498 A1* | 11/2016 | Jamieson | G01S 5/02213 |
| 2021/0056365 A1* | 2/2021 | Sivan | G06V 20/58 |
| 2021/0124006 A1 | 4/2021 | Sheng et al. | |
| 2021/0321221 A1* | 10/2021 | Yerramalli | G01S 5/0278 |

FOREIGN PATENT DOCUMENTS

WO    2019204168 A1    10/2019

* cited by examiner

*Primary Examiner* — Fabricio R Murillo Garcia
(74) *Attorney, Agent, or Firm* — Kilpatrick Townsend & Stockton LLP

(57) ABSTRACT

In some aspects, a mobile device may receive, from a transmitting device, the signal by a plurality of antennas. The mobile device may measure one or more phase differences among the signal received at the plurality of antennas. The mobile device may determine a first set of possible values for the angle of arrival that are consistent with the one or more phase differences. The mobile device may measure one or more signal values using one or more sensors of the mobile device. The mobile device may for each of the first set of possible values, determining a confidence score based on the one or more signal values. The mobile device may select, based on the confidence scores, one of the first set of possible values as the angle of arrival.

18 Claims, 14 Drawing Sheets

|  | T1 | T2 | T3 | NT1 | NT2 | NT3 | NT4 |
|---|---|---|---|---|---|---|---|
| $y_k^1$ | $g_{11}$ | × | × | $g_{41}$ | × | × | × |
| $y_k^2$ | $g_{12}$ | $g_{22}$ | × | × | $g_{52}$ | × | × |
| $y_k^3$ | × | × | × | × | × | $g_{63}$ | × |
| $y_k^4$ | × | × | $g_{34}$ | × | × | × | $g_{74}$ |

FIG. 4

TECHNIQUES TO DISAMBIGUATE ANGLE OF ARRIVAL

BACKGROUND

Mobile devices can include multiple ultra-wideband (UWB) antennas installed on one side of a mobile device. The UWB antennas can receive wireless signals (e.g., for ranging). The angle of arrival (AoA) for a signal from another device can be calculated. The Angle of Arrival (AoA) can be determined between pairs of antennas. But maintaining an accurate measurement of the AoA can be difficult, particularly for devices having constrains on antenna locations.

BRIEF SUMMARY

Embodiments can be used to identify and resolve ambiguities in initial measurements of an Angle of Arrival (AoA) of a signal from another device. With three antennas there can be three pairs (each possible combination of two pairs of calculations from the total of three antennas) that can provide three angles for measuring AoA. The difference in time of arrival is a function of antenna spacing on the mobile device. The optimal spacing is ½ wavelength of the signal; but due to space limitations on mobile devices, AoA measurement techniques can be difficult to implement in mobile devices because optimal spacing is not always achieved. Due to spacing and other propagation issues (e.g., multipath propagation), there can be ambiguities as to which side of the device (e.g., front or back) the signals are originating from. With current device geometry, there can be up to three hypotheses per side.

Various techniques are disclosed for resolving an ambiguity in measurements of AoA, e.g., to resolve which one of possible angles (hypotheses) is correct. To resolve any ambiguity, a score can be determined for each hypothesis, where the scores are used to determine which hypothesis is correct. Various techniques can be used to determine a confidence score that can be used for determining which angle of the possible angles (hypotheses) is correct.

In some embodiments, the techniques for determining an angle of arrival for a signal received by an electronic device with a plurality of antennas can include receiving, from a transmitting device, the signal by a plurality of antennas. The techniques can include measuring one or more phase differences among the signal received at the plurality of antennas. The techniques can include determining a first set of possible values for the angle of arrival that are consistent with the one or more phase differences. The techniques can include measuring one or more signal values using one or more sensors of the electronic device. For each of the first set of possible values, determining a confidence score based on the one or more signal values. The techniques can include selecting, based on the confidence scores, one of the first set of possible values as the angle of arrival.

Such techniques can be combined to provide an overall tracking score to determine which hypothesis is correct. Example techniques can include using a motion sensor, a machine learning model to determine which region around the device that the signal is received, a received signal strength indicator (RSSI), and a measurement in using a different frequency (channel diversity).

In some embodiments, a sensor fusion technique can involve comparing data from different sensor sources to reduce ambiguity. At a certain time, the mobile device can determine the phase difference of arrival (PDOA) for a signal. The device can determine that there are multiple hypotheses that might be correct.

In one technique using a motion sensor (e.g., an accelerometer/gyroscope), the motion of the device can be calculated. The measurements can be taken at multiple times, e.g., at approximately 50 Hertz (Hz). Based on the motion of the mobile device, a prediction can be made for what the new AoA should be for each hypothesis. Then, new AoA measurements can be compared to the predicted values. If only one predicted AoA value is close (e.g., within an error tolerance) to the new AoA measurement, then that angle can be selected as the correct one. At each new measurement, a tracking score can be determined based on the ranging measurements and the motion sensor measurements. Once a tracking score is above a threshold, then the corresponding angle can be selected. The correct hypothesis is consistent with motion assuming the transmitting device is relatively stationary. A motion classification can be sent from a second device to the mobile device to characterize its level of motion of the second device.

In another technique, a machine learning model can be used to determine the probability of each viable hypothesis (i.e., possible AoA) being the correct one. The neural network can receive raw signal data from the transmitter processor (e.g., 8 channel-impulse-response values for each antenna per measurement) and calculate probabilities of which hypothesis is the correct one. For example, the area around the phone can be broken up into various regions. In one implementation, six distinct regions are used having one screen-side region, and four regions on the camera side, and one region at the top of the phone. The model can classify the region, and different hypotheses can be in different regions, so one can resolve the ambiguity.

RSSI can be an estimated measure of power level that the mobile device is receiving. The RSSI between the screen side and the camera side of the mobile device can be asymmetric. In some implementations, the screen side has an RSSI that is lower because the antennas are on the camera side of the mobile device. Therefore, RSSI can be measured and be used to resolve the ambiguity.

Ambiguity can also be reduced using a channel diversity technique. UWB ranging can support multiple channels (e.g., 8.0 GHz and 6.5 GHz). As channel diversity exists between the channels, some of the measurements can be made on one channel and other measurements can be made on a second channel. The true hypothesis to resolve the side ambiguity can stay consistent as the channels are changed but the aliasing hypotheses can be quite different. The technique resolves the ambiguity by comparing the different measurements as the channels are changed.

One or more of these four measurements can be combined to determine an overall quality indicator or trust score. A predetermined threshold can be used to evaluate the trust score to resolve the ambiguity and report the AoA to the user.

A better understanding of the nature and advantages of embodiments of the present disclosure may be gained with reference to the following detailed description and the accompanying drawings.

BRIEF DESCRIPTION OF THE DRAWINGS

FIG. 4 illustrates an exemplary chart for assigning tracks for tracking targets.

Like reference, symbols in the various drawings indicate like elements, in accordance with certain example implementations. In addition, multiple instances of an element may be indicated by following a first number for the element with a letter or a hyphen and a second number.

DETAILED DESCRIPTION

Figure 1:
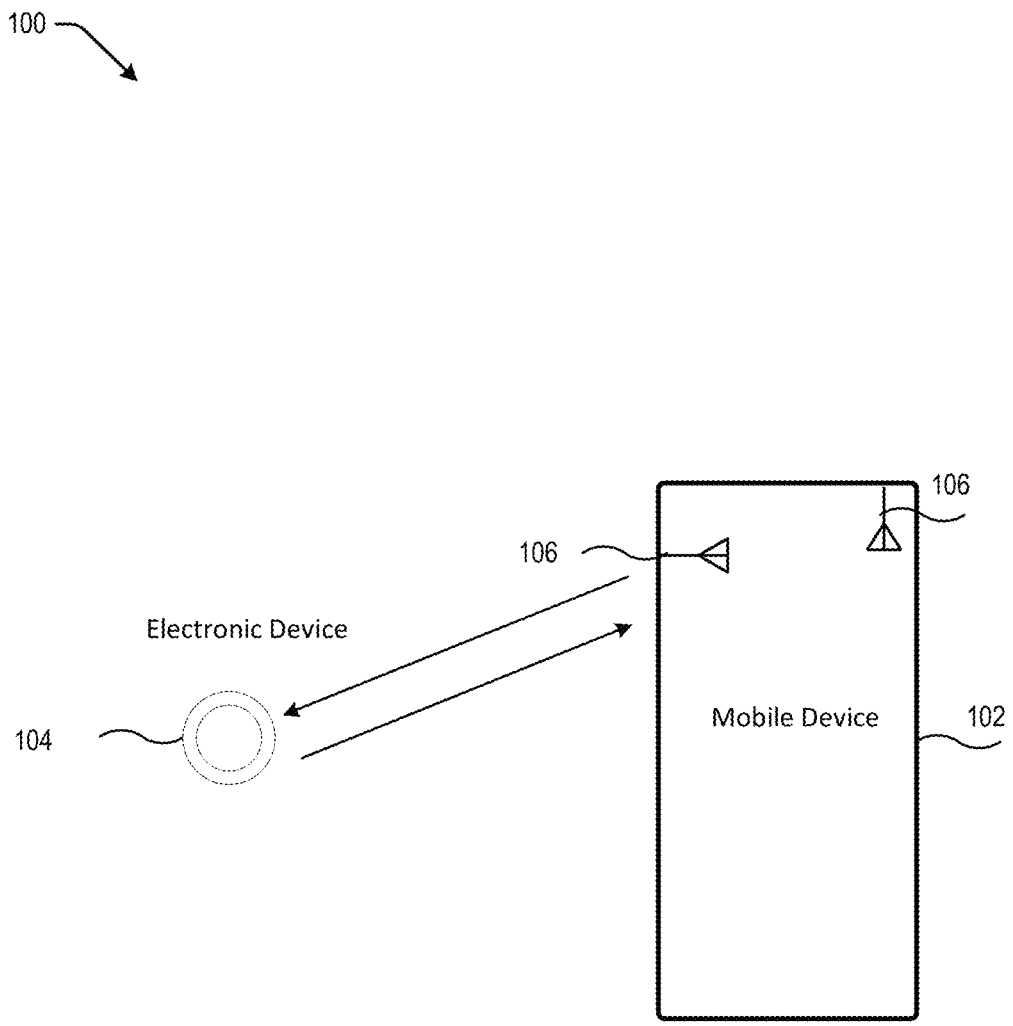
FIG. 1 illustrates exemplary communications between a mobile device and an electronic device.

Mobile devices can include multiple UWB antennas installed on a front side or a back side of a mobile device. The UWB antennas can receive wireless signals (e.g., for ranging). The AoA for a signal from another device can be calculated by comparing the difference in signals received between pairs of antennas. The difference in time or phase of arrival can be a function of antenna spacing on the mobile device. Due to spacing and other propagation issues (e.g., multipath propagation), there can be ambiguities as to which side of the device (e.g., front or back) is closest to the device transmitting the signals. With current device geometry with at least two antennas located on a back side of a device separated by a distance d, there can be up to three hypotheses per side. The following techniques can be used to resolve that ambiguity.

Various techniques are disclosed for resolving ambiguity in the AoA of a signal. The techniques can be combined to provide an overall tracking score to determine which hypothesis is correct. The techniques can include sensor fusion, a machine learning model, received signal strength indicator (RSSI), and a measurement of using a different frequency (channel diversity).

In some embodiments, a sensor fusion technique can involve comparing data from different sensor sources to reduce ambiguity. At a certain time, the mobile device can determine the phase difference of arrival (PDOA) for a signal. The device can determine that there are multiple hypotheses that might be correct. Using an accelerometer or another motion sensor, the motion of the device can be calculated. The measurements can be taken at multiple times, e.g., at approximately 10 Hertz (Hz). Based on the motion of the mobile device, a prediction can be made for what the new AoA should be for each hypothesis. Then, new AoA measurements can be compared to the predicted values. If only one predicted AoA angle value is close (e.g., within an error tolerance) to the new AoA measurement, then that angle can be selected as the correct one.

For new measurements, a tracking score can be determined based on the ranging measurements and the motion sensor measurements. Once a tracking score is above a threshold, then the corresponding angle can be selected. The correct hypothesis is consistent with motion assuming the transmitting device is relatively stationary. A motion classification can be sent from a second device to the mobile device to characterize its level of motion of the second device.

In one technique, a machine learning model can be used to determine the probability of each viable hypothesis (i.e., possible angle) being the correct one. The neural network can receive raw signal data from a signal transmitter processor (e.g., 8 channel-impulse-response values for each antenna per measurement) and calculate probabilities of which hypothesis is the correct one.

For example, the area around the phone can be broken up into various regions. In one implementation, six distinct regions are used having one screen-side region, and four regions on the camera side, and one region at the top of the phone. The model can classify the region, and different hypotheses can be in different regions, so one can resolve the ambiguity.

RSSI can be an estimated measure of power level that the mobile device is receiving. The RSSI between the screen side and the camera side of the mobile device can be asymmetric. In some implementations, the screen side has an RSSI that is lower because the antennas are on the back of the mobile device. Therefore, RSSI can be measured and be used to resolve the ambiguity.

Ambiguity can also be reduced using a channel diversity technique. UWB ranging can support multiple channels (e.g., 8.0 GHz and 6.5 GHz). As channel diversity exists between the channels, some of the measurements can be made on one channel and other measurements can be made on a second channel. The true hypothesis to resolve the side ambiguity can stay consistent as the channels are changed but the aliasing hypotheses can be quite different. The technique resolves the ambiguity by comparing the different measurements as the channels are changed.

One or more of these four measurements can be combined to determine an overall quality indicator or trust score. A predetermined threshold can be used to evaluate the trust score to resolve the ambiguity and report the AoA to the user.

I. Initial Determination of Angle of Arrival

FIG. 1 shows a mobile device 102 communicating with an electronic device 104 using an antenna array 106. The mobile device 102 can be a smart phone, a wearable device (e.g., an electronic watch), a tablet, a laptop computer, a smart home appliance (e.g., Apple HomePod), etc. The electronic device 104 can be an electronic tag. The electronic tag environment can be subject to multipath propagation of signals therefore requiring extra quality checks for layer for reporting.

The mobile device 102 and the electronic device 104 can exchange information during the communication sessions. The communications can be done using a wireless protocol (e.g., UWB). The communications can be used to determine a range between the mobile device 102 and the electronic device 104. In various embodiments, the communications between the mobile device 102 and the electronic device 104 can be one-way (e.g., from the electronic device to the mobile device 102 or vice versa). The communications can also be used to determine an angle of arrival of the wireless signals. For example, the mobile device 102 receive wireless signals from the electronic device 104 and calculate a range and an angle of arrival. In this way, the mobile device 102 calculate and display the angle of arrival information to precisely locate the electronic device 104. The electronic device 104 can be an electronic tag that can be used to located personal items (e.g., keys, wallet, purse, vehicles). The electronic device 104 can be any UWB capable devices (e.g., a tablet computer, a laptop computer, a smartphone, and a wearable device (e.g., earbuds, electronic watch, or smart glasses)). The communication between the mobile device 102 and the electronic device 104 can allow the mobile device to determine an AoA for signals received by the mobile device 102. The calculated AoA can allow the mobile device 102 to locate the electronic device 104 which can be used to precisely locate the electronic device 104. For example, if the electronic device 104 is close by but in a cluttered environment (e.g., in between cushions on a couch) the AOA information can be used to display an indicator pointing to the location of electronic device 104 on the display of the mobile device 102.

Figure 2A:
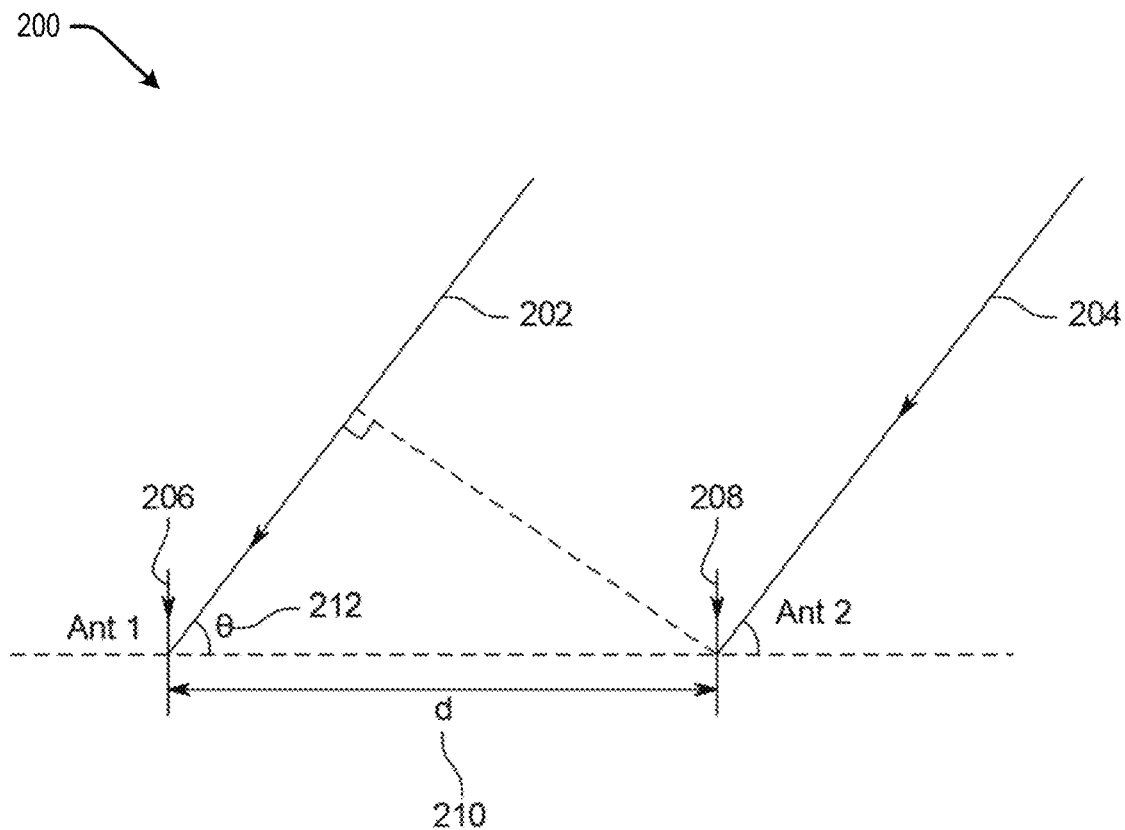
FIG. 2A illustrates reception of signals at two antennas separated by a fixed distance.

FIG. 2A shows a view of the signal's arrival 202-204 at each antenna array 206-208 with the distance between each antenna array 210 and the angle of arrival 212. The transceiver can determine the wavelength of the signal that is received at the antenna. The distance between the antenna can be known for each mobile device and the distance information can be coded in the device software. The phase difference of arrival (PDOA) can be calculated after the signal reception at the antenna. Accordingly, the angle of arrival for a signal received at a mobile device can be calculated. AoA with PDOA is scalable and can be used to determine the AoA for signals from multiple electronic devices arriving at a single mobile device.

Figure 2B:
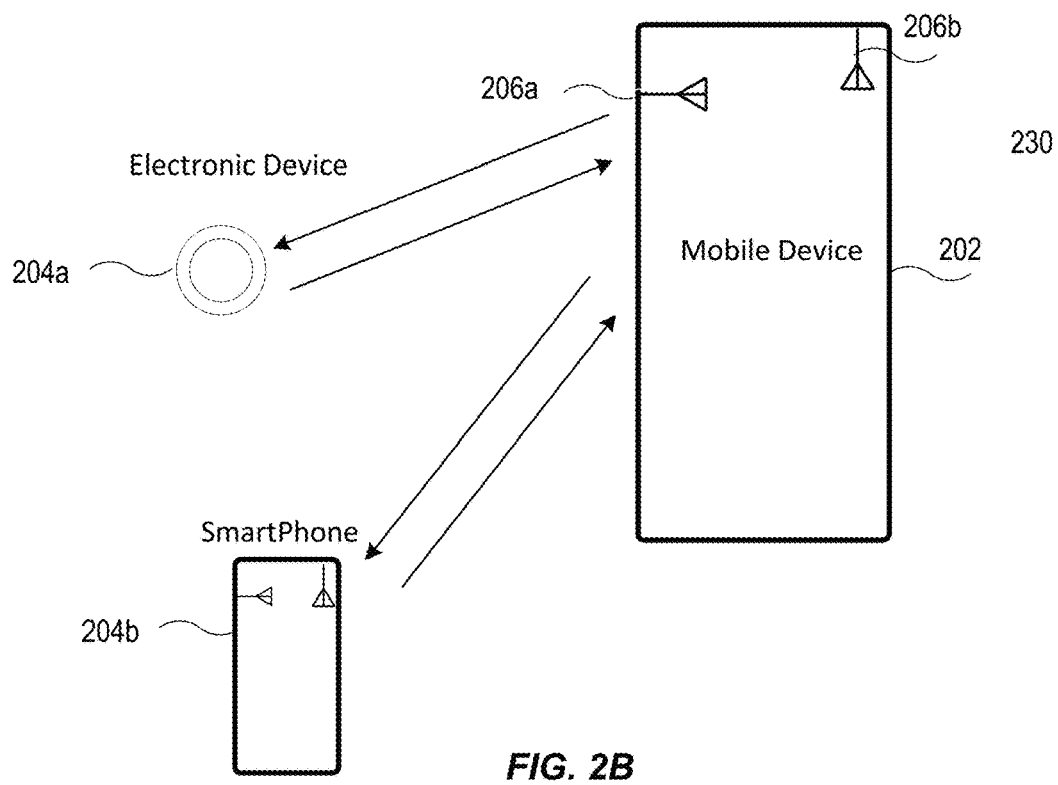
FIG. 2B illustrates exemplary communications between a mobile device and a plurality of electronic devices.

FIG. 2B illustrates an electronic devices 204a, and a smartphone 204b communicating with a mobile device 202. The mobile device 202 can conduct ranging with the electronic device 204a, and the smartphone 204b. In some examples, the electronic device 204a, and the smartphone 204b may at the same range. In addition, the electronic devices 204a, and the smartphone 204b may transmit signals using the same wireless frequency. The wireless signals can be received by the antenna array 206a, 206b and the TDOA or PDOA between the received signals can be used to calculate the AOA for each of the received signals. Therefore, AoA can be used to identify signals from which electronic device 204a, and the smartphone 204b the wireless communications originated.

The angle of arrival (AoA) for a signal is the direction that signal is received at an antenna array. The AoA can be calculated from the phase difference of arrival (PDOA) between two or more antennas. PDOA methods can be the most accurate if the antennas in the array are separated by a distance equal to half the signal's wavelength. Each pair of antennas can determine an AoA in a single plane. By using an array of three antennas, a three dimensional AoA can be determined. PDOA can be calculated using the following formula where α is the PDOA, d is the distance between the sensors, θ is the angle of arrival, and λ is the signal wavelength:

$$\alpha = \frac{d*\cos\theta}{\lambda}2\pi$$

The PDOA formula can be rearranged so that the angle of arrival can be determined from a measured PDOA:

$$\theta = \cos^{-1}\frac{\alpha*\lambda}{d*2\pi}$$

The AoA calculations can be performed using the one or more processors of the mobile device 202. The one or more processors can process three chins of signals and measure the PDOA between the vertical pair and the horizontal pair. In various embodiments, the PDOA measurements are made on the surface of the device and PDOA offset at (azimuth=90, elevation=90) for each device to account for the unknown path delays.

II. Multiple Hypothesis Tracking

Target tracking can be used in ranging systems employing one or more sensors, together with computer subsystems, to interpret the environment. Typical sensor systems, such as radar, infrared (IR), and sonar, report measurements from diverse sources: targets of interest, physical background objects such as clutter, or internal error sources such as thermal noise. The target tracking objective is to collect sensor data from a field of view (FOV) containing one or more potential targets of interest and to then partition the sensor data into sets of observations, or tracks that are produced by the same object (or target).

In some instances, uncertainty can result in several viable AoA hypothesizes as to the true location of the target. The techniques can maintain all possible hypotheses (T1, T2, ... ) until the AoA ambiguity is resolves. The techniques can calculate range and AoA for a multiple targets. Extended Kalman Filtering (EFK) techniques can be used for target tracking. The tracking can include gating, data association, disambiguation of hypothesis, and updating track score and reporting AoA solution. Techniques to resolve ambiguity are described herein.

A. Data Preparation

Before disambiguation of the AoA hypotheses performed to resolve AoA ambiguity, the signal data can be prepared. Such data preparation can include gating and/or data association.

1. Gating

Gating involves determining which measurements are considered valid for a target. It is considered a method for pruning matches that are geometrically unlikely from the start. This allows the system to decompose matching into smaller sub-problems. The predicted position can be described for the $i_{th}$ target at the time k using the following notation:

$$\bar{y}_k^i$$

Figure 3:
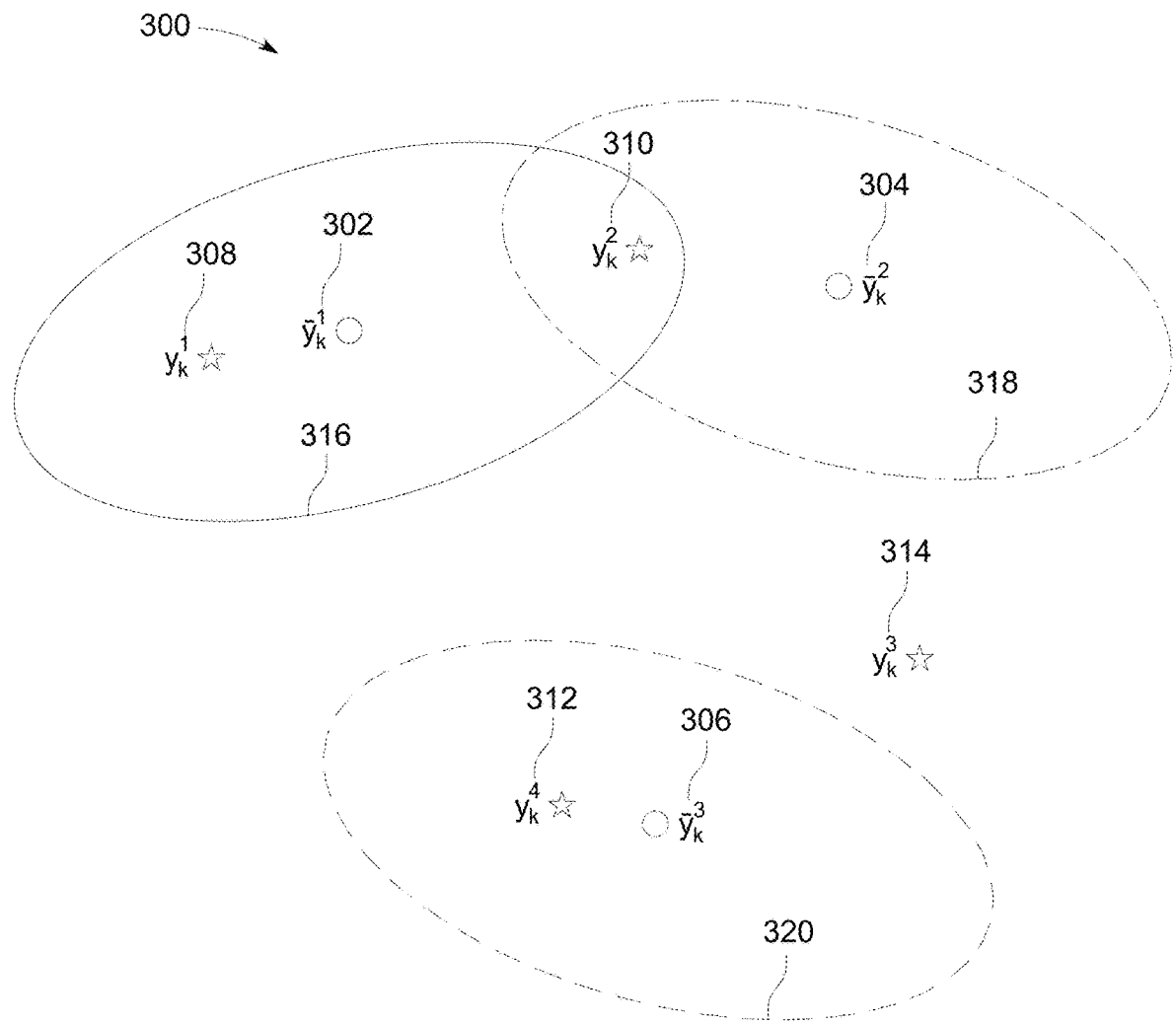
FIG. 3 illustrates an exemplary gating technique for determining valid targets.

FIG. 3 is an illustration of gating according to the present disclosure. FIG. 3 illustrates three targets 302, 304, 306. The ellipsoid 316 represents an area likely for target number one (i.e., one possible value for the AoA). The ellipsoid 316 can be a normal 3-dimensional XYZ coordinates in the mobile device's body frame. Ellipsoid 318 represents an area likely for target number two. Ellipsoid 320 represent an area likely for target number 3. Measurement $y_k^1$ 308 represents the predicted position for target number one at time k, $y_k^2$ 310 represents the first AoA hypothesis at time k, $y_k^3$ 314 represents the predicted position for target number two at time k, and $y_k^4$ 312 represents the predicted position for target number three at time k.

For example, $y_k^1$ can be assigned to tracking target 1, $y_k^2$ can be assigned to either target 1 or target 2, but not both. $y_k^3$ cannot be assigned to any existing target because it falls outside all of ellipsoids 316, 318, 320. And a different notation can be used to describe the position of the $j_{th}$ measurement at the time k:

$$y_k^j$$

Ellipsoid gating can be used to determine whether a measurement is assigned to a tracking target if the measurement falls into the gated ellipsoid γ or the distance between the two positions is less than a threshold distance:

$$d^2 = (y_k^j - y_k^{-i})^T S_k^{-1} (y_k^j - y_k^{-i}) \overset{\leq}{>} \gamma$$

A first measurement 308 can be assigned to a first tracking target 302 because the measurement falls within the first ellipsoid 316. A second measurement 310 can be assigned to either the first target 302 or the second target 304 because the measurement is within both the first ellipsoid 316 and the second ellipsoid 318. However, the second measurement 310 can only be assigned to one target and cannot be assigned to both the first target 302 and the second target 304. A third measurement 314 is not within any ellipsoid and cannot be assigned to any target while the fourth measurement 312 can be assigned to a third target 306 because it is within the third ellipsoid 320.

2. Data Association

FIG. 4 illustrates an exemplary chart for assigning measurements for tracking targets. Gating raises the issue of where a measurement, like 310 should be assigned. 302 can be assigned to two different targets but cannot be assigned to both. For the chart depicted in FIG. 4, the column indices:

$$\{j_1, j_2, j_3, j_4\}$$

Where $j_m! = j_n$ for m!=n, should be chosen such that: $\Sigma_{i=1}^4 g_{ji}$ is maximized where $g_{ji}$ is the gain of assigning the $j_{th}$ measurement to the ith tracking target To solve this problem, a global nearest neighbor algorithm can be used. The best data association is chosen so the sum of the gain is maximized. The measurements associated with existing targets can be processed by target Extended Kalman filters (EKFs) while the measurements associated to not tracked can be handled by initiator logic.

B. Techniques to Disambiguate the Angle of Arrival Hypothesis

Several techniques for disambiguating the angle of arrival hypothesis are presented herein. The techniques include motion determination for multiple hypothesis tracking, a neural network classifier, RSSI, and channel diversity.

1. Motion Determination for Multiple Hypothesis Tracking

Figure 5A:
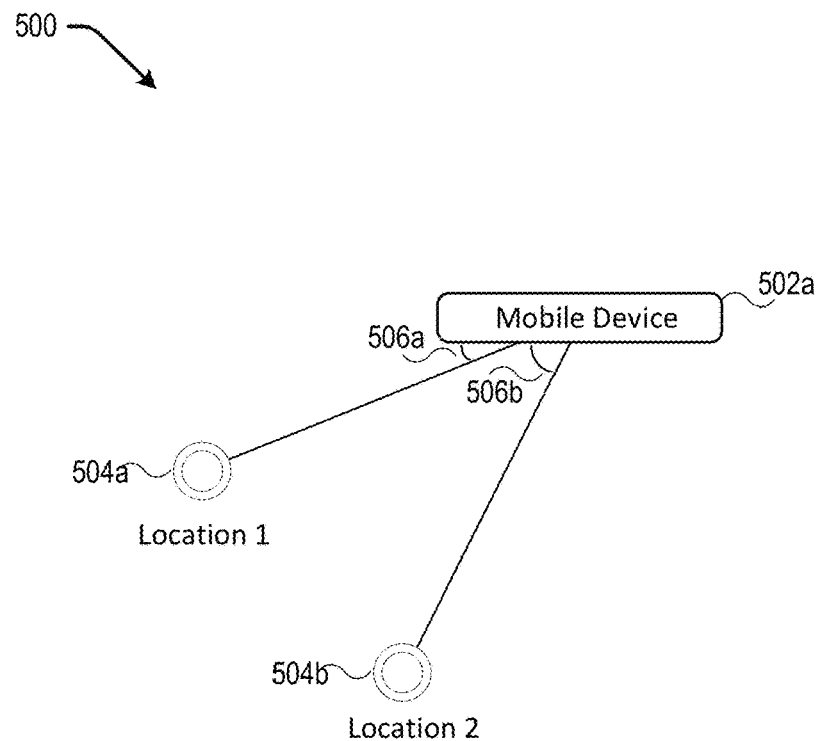
FIG. 5A illustrates exemplary estimates of two possible hypotheses of a device location at a first orientation of a mobile device.

FIG. 5A illustrates exemplary estimates of two possible hypotheses of a device location at a first orientation of a mobile device. Motion sensors on a mobile device 502a, 502b can provide accurate acceleration and rotation rate data, and this motion data can be used to eliminate hypotheses that are inconsistent with the motion data. FIG. 5A shows a top perspective of a mobile device 502a at a first orientation with two possible electronic device locations 504a, 504b. Two possible AoA values 506a, 506b have been determined based on the signals received at the mobile device 502a. After determining several AoA hypotheses, with the mobile device 502a at a first orientation, the mobile device 502a can be rotated by an angle that can be detected by the device's motion sensors.

Figure 5B:
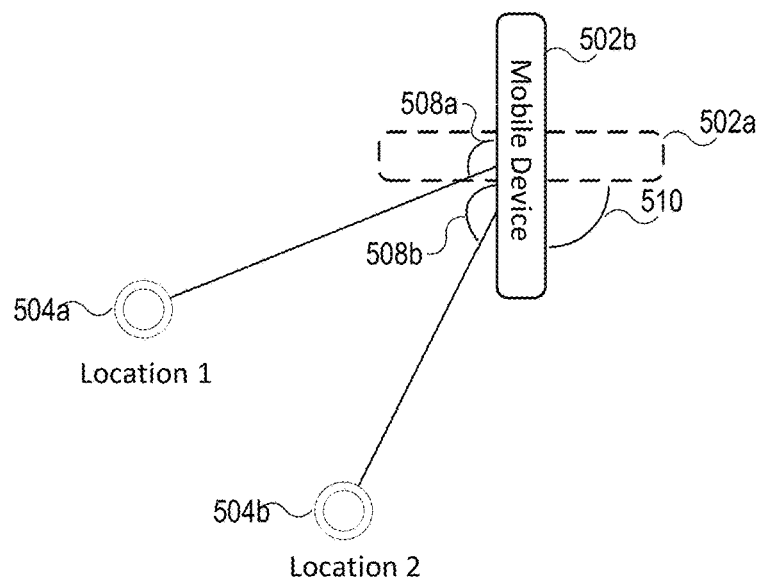
FIG. 5B illustrates exemplary estimates of two possible hypothesis of a device location at a second orientation of a mobile device.

FIG. 5B shows the mobile device at a second orientation 502b after it was rotated by a known angle 510. At the second orientation, the hypotheses can be updated 508a, 508b and compared to the measured change in the mobile device's orientation 510. If an updated hypothesis 508a, 508b is changed by an angle that is inconsistent with the measured change in rotation 510, that hypothesis can be excluded. An updated hypothesis 508a, 508b can be inconsistent if the difference between the change in the hypothesis and the measured change 510 in the mobile device's rotation is greater than a threshold value. The mobile device's rotation can be measured using an accelerometer and gyroscope of the mobile device.

Example motion sensors can include one or more accelerometers or gyroscopes. Other types of motion (e.g., linear motion) can be used in addition to angular motion to determine inconsistencies to resolve the ambiguity.

2. Machine Learning Classifier

In various embodiments, a machine learning field of view classifier may be used to resolve the ambiguity in a timely manner. The machine learning classifier is the application of machine learning techniques (such as a neural network) to classify the AoA of a signal. A neural network consists of an artificial network of functions which allows the computer to learn, and to fine tune itself, by analyzing new data. Each function, sometimes also referred to as neurons, produces an output, after receiving one or multiple inputs. Those outputs are then passed to the next layer of neurons, which use them as inputs of their own function, and produce further outputs. Those outputs are then passed on to the next layer of neurons, and so it continues until every layer of neurons have been considered, and the terminal neurons have received their input. Those terminal neurons then output the final result for the model.

The mobile device's surface is divided into a number of regions. Each region can be the same size or there can be different size regions around the mobile device.

Figure 6:
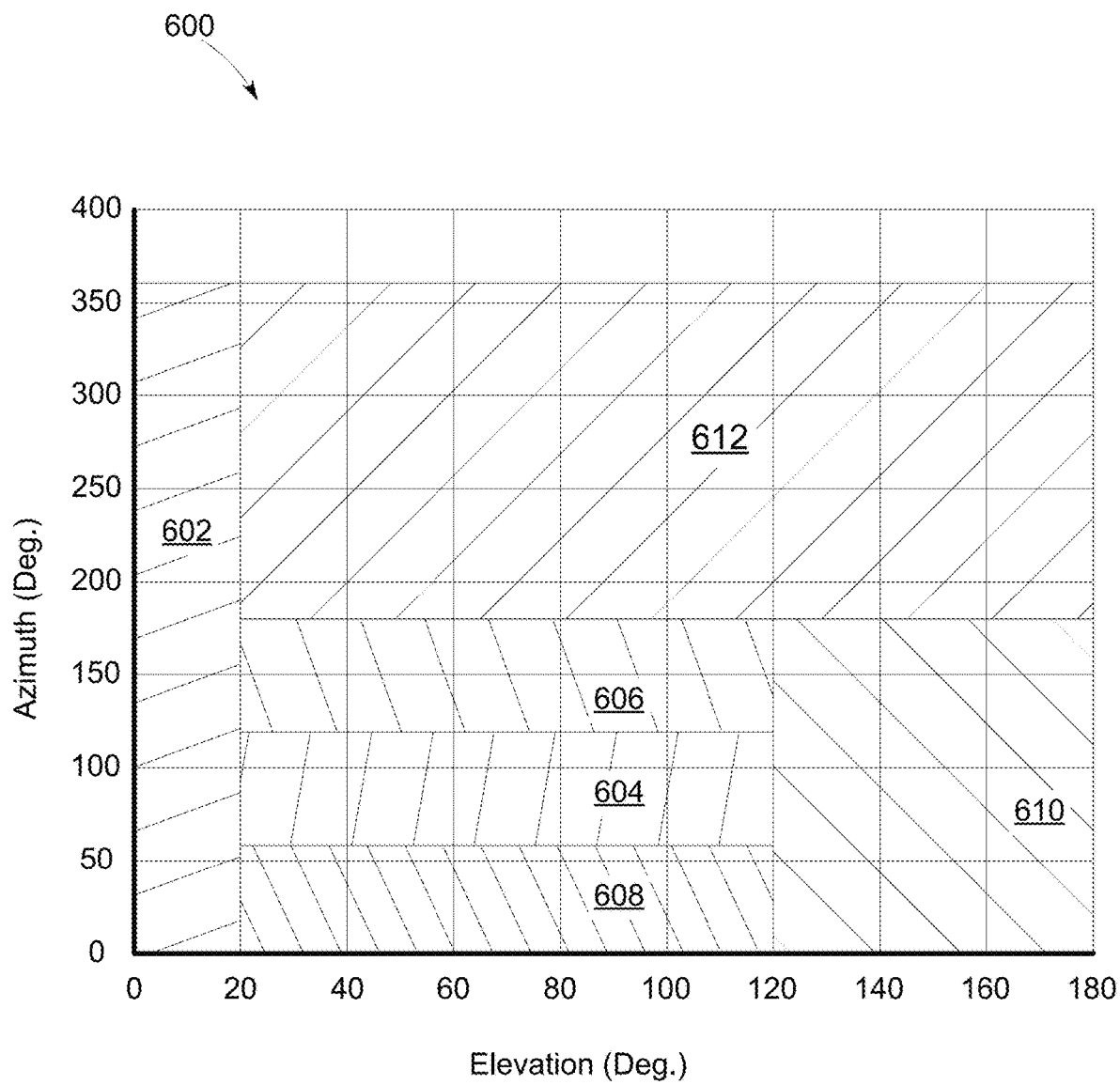
FIG. 6 illustrates an exemplary graph of probability zones for receipt of a signal for a mobile device where the zones are characterized using in azimuth and elevation of the mobile device.

FIG. 6 shows a graph depicting different regions 602, 604, 606, 608, 610, 612 around a mobile device. The non-field of view area (the screen side of the device) can be represented by a single region 612 while the field of view (FOV) area can be subdivided into multiple regions 602, 604, 606, 608, 612. The field of view can include the top 602 and bottom 610 of the device as well as three regions for the camera side of the device 604, 606, 608. The machine learning model can be trained using training samples, signals generated by electronic devices with a known AoA, to determine the AoA for signals with an unknown AoA. The input for the classifier can be an 8-point Channel Impulse Responses (CIRs) of 3 chains. Given a signal with an unknown AoA the neural network classifier outputs a 1×6 probability vector that indicates the probability of the true AoA in each of the regions around the mobile device 602-612.

The training samples can be used to train the model. Accordingly, the electronic devices with a known AoA can be used in conjunction with machine learning techniques (e.g., random forests, support vector machine, artificial neural networks, etc.) to optimize a cost/loss function, to get the parameters of the classification model. As part of the training, the classification model can be tuned, by updating model variables, until the predictive model accurately categorizes the training set.

An entire set of electronic devices with a known AoA can be split into a training set and a test set. The test set is not used during the training and will be used later to evaluate if the model, developed only with the training set, makes accurate predictions. If the model accurately categorizes the evaluation set, the model can be extended to categorize new data sets.

Figure 7:
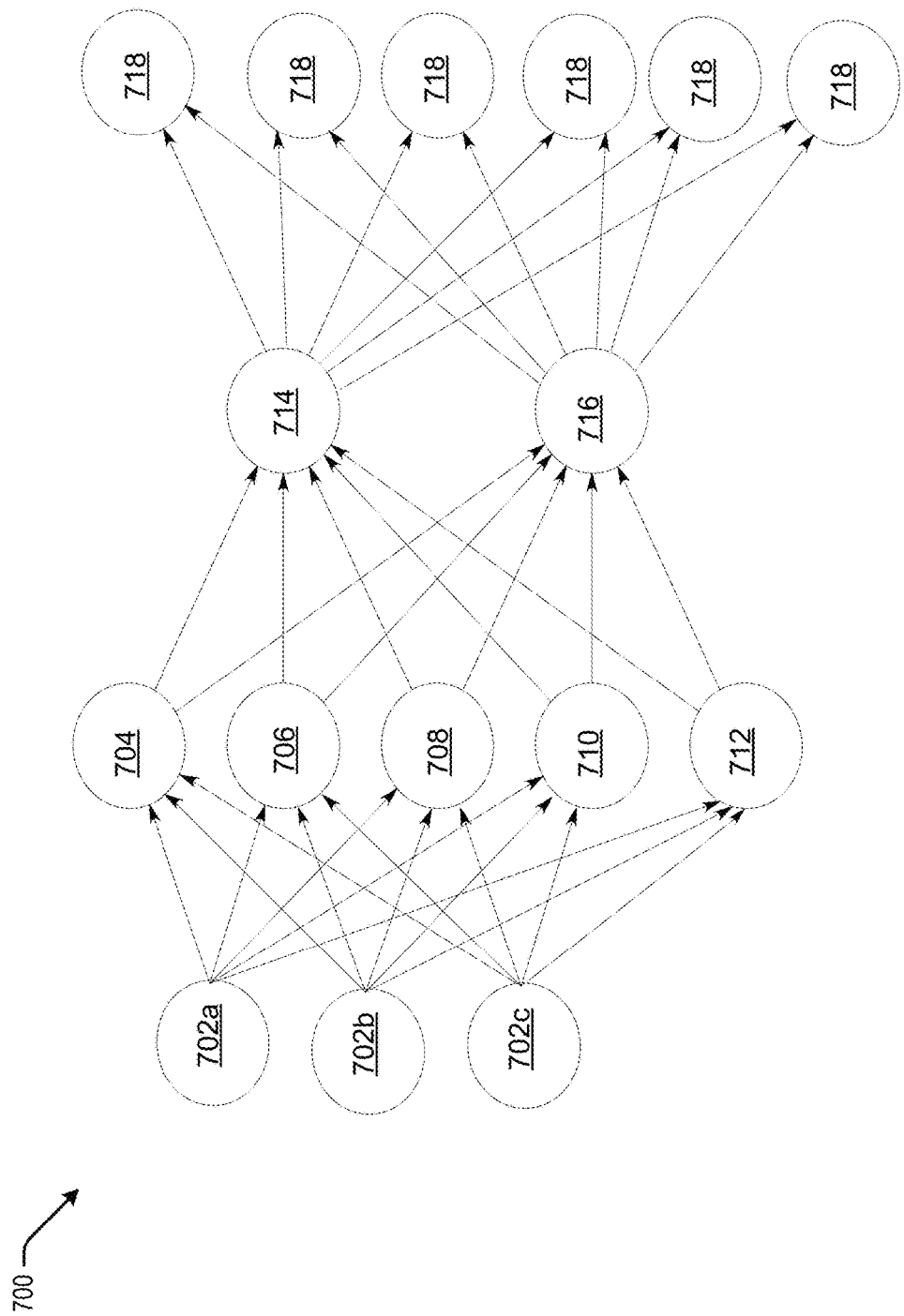
FIG. 7 illustrates a neural network that can be used to resolve an ambiguity of which region of mobile device a signal originates.

FIG. 7 shows an example machine learning model of a neural network 700. The neural network 700 can include input nodes 702, a hidden layer comprising multiple intermedia nodes 704-716 and output nodes 718. The inputs for the neural network can be measurements from antennas while the outputs can be the probability that the signal originates from one of the six regions 602, 604, 606, 608, 610, 612. A node layer can be a row of those neuron-like switches that turn on or off as the input is fed through the net. Each layer's output can be simultaneously the subsequent layer's input, starting from an initial input layer receiving the data. Networks that include multiple layers can be known as a stacked neural network. Embodiments using neural networks can employ using wide and tensorized deep architectures, convolutional layers, dropout, various neural activations, and regularization steps. The neural network can comprise a number of neurons (e.g., Adaptive basis functions) organized in layers. The training of the neural network can iteratively search for the best configuration of the parameter of the neural network for feature recognition and classification performance. Various numbers of layers and nodes may be used. A person of skill in the art can easily recognize variations in a neural network design and design of other machine learning models.

The result of the neural network can be a numerical probability value for each of the six different regions around the mobile device.

3. Received Signal Strength Indicator

Received signal strength indicator (RSSI) is a measure of the power in a received signal. Each antenna in a mobile device's array can be configured to measure the received signal strength. As the device is rotated, the signal strength for each antenna in the array will vary. The signal strength can be presumed to be highest when the antenna is facing the device sending the signal. Accordingly, resolving the ambiguity, specifically whether the front side of the mobile device or the rear side of the mobile device can be determined by finding the side where the signal strength received by the antenna array is maximized. If the RSSI is below a threshold value, the signal is likely originating from the front side.

Figure 8:
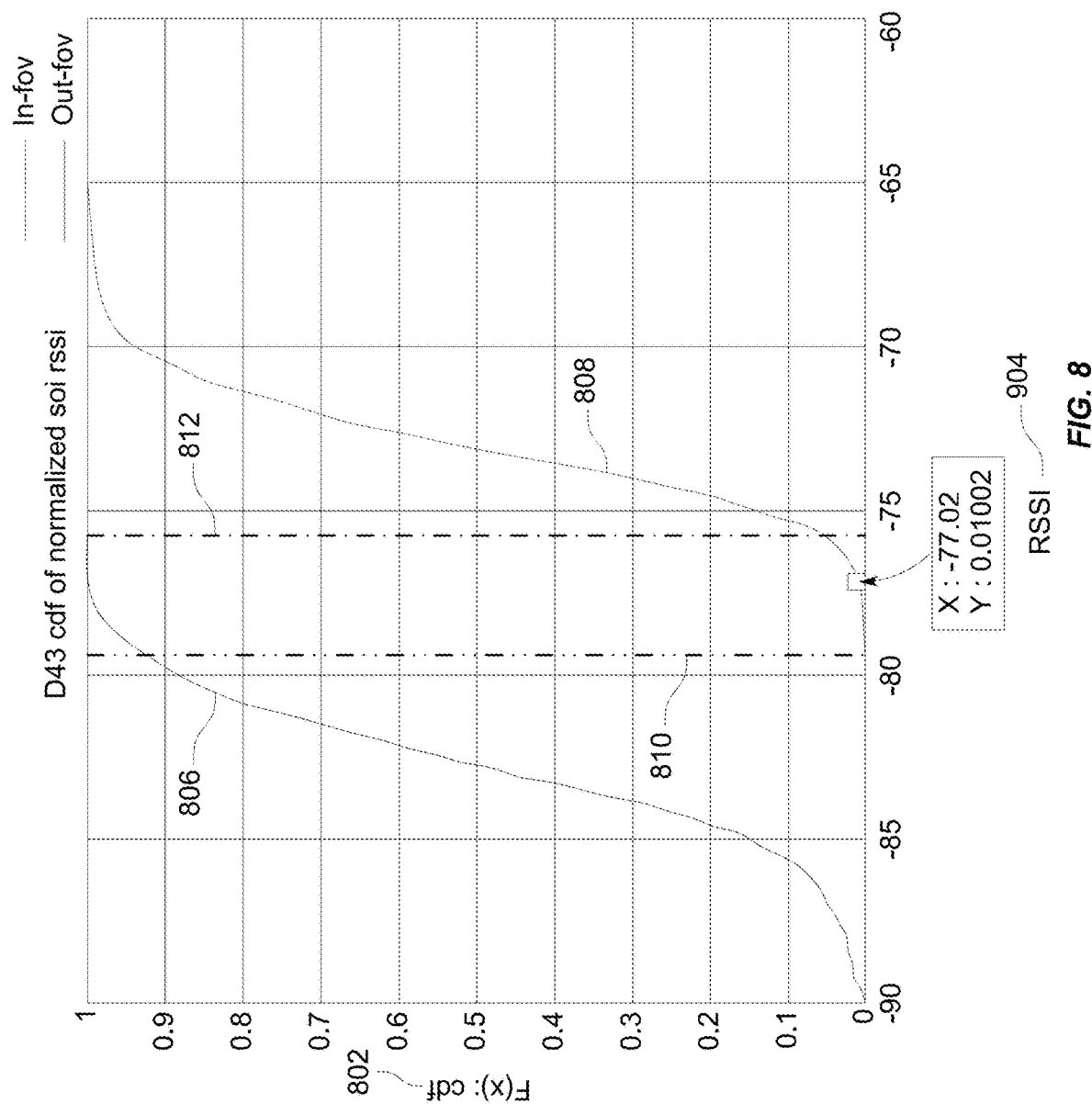
FIG. 8 illustrates a chart for analyzing a received signal strength indication for resolving ambiguity.

FIG. 8 shows a graph of RSSI results according to embodiments of the present disclosure. A normalized cumulative distribution function (CDF) curve 806 can show the confidence that, based on the RSSI, an electronic device transmitting a signal is within the field of view (FOV) and hence originating from the back side of the mobile device. A second CDF curve 808 can represent the confidence that a signal is outside the FOV and hence on the front side of the device. A first boundary line 810 can represent the upper value for the out of FOV line 806. Below the first boundary line 810, the signal is likely originating from the front of the device. A second boundary line 812 can represent the lower value for the in FOV line 808. Above the second boundary line 812, the signal is likely originating from the back of the device. Therefore, the RSSI measurements can be used to resolve the ambiguity as to which side of the device the signal is originating.

4. Channel Diversity

Channel diversity is a technique to improve accuracy that involves comparing measurements from different radio frequency channels. In various embodiments, UWB ranging can support multiple channels (e.g., 8.0 GHz and 6.5 GHz). Making an AoA prediction using multiple channels can result in two separate angle predictions each with an amount of uncertainty. However, in many instances the predictions, and uncertainties, are not coextensive. When the uncertainties for each channel overlap, the actual location can be assumed to be within the overlapping uncertainty. By identifying points of overlapping uncertainty, the ambiguity of each individual channel can be narrowed.

C. Combination of Techniques

Figure 9:
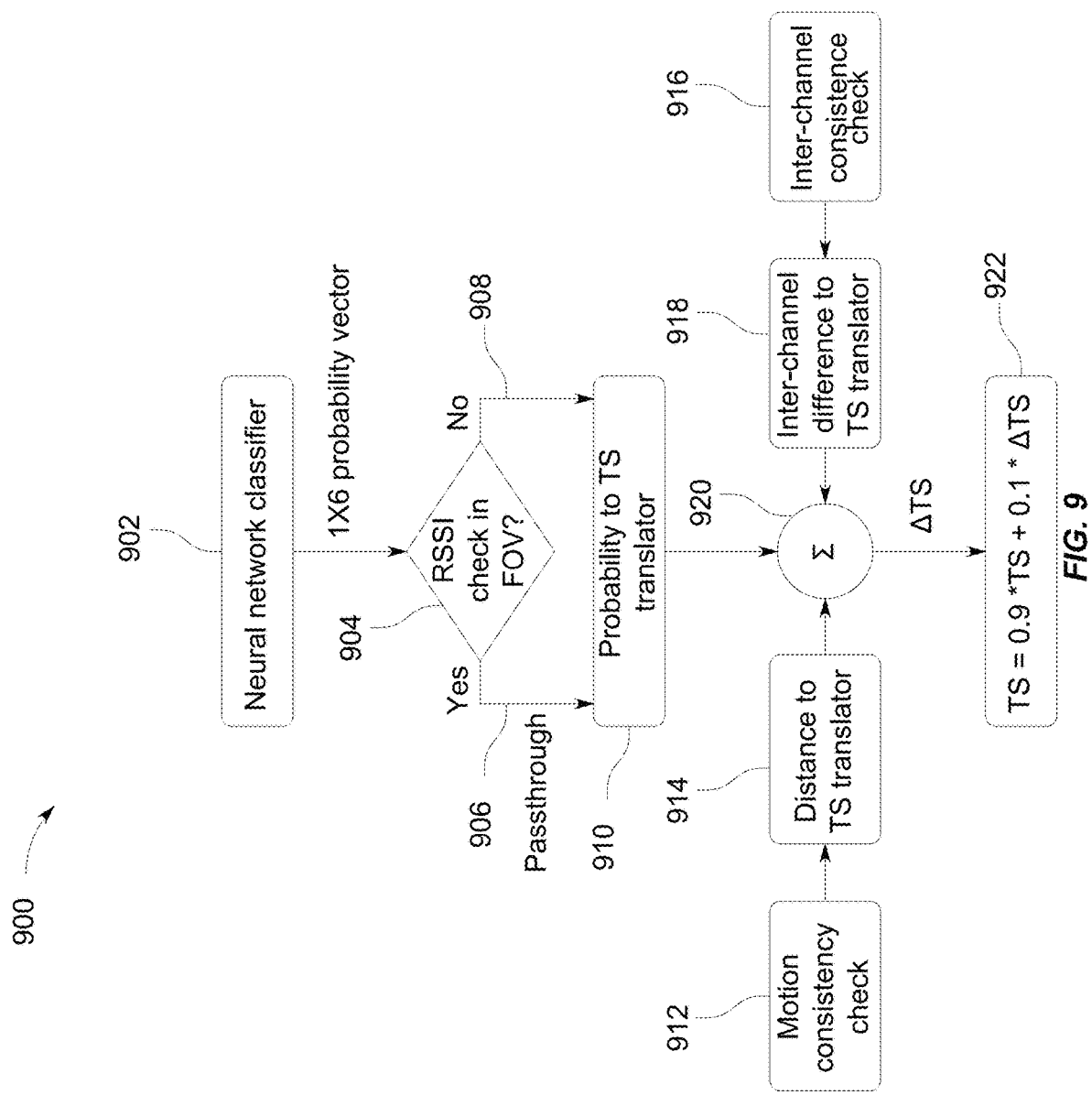
FIG. 9 illustrates an exemplary flow chart for updating track score for a signal at a mobile device.

FIG. 9 illustrates an exemplary flow chart for resolving ambiguity for a signal at a mobile device. While each of the techniques described above could be used to reduce some ambiguity among AoA hypothesis, by combining the techniques the ambiguity can be reduced further. The ambiguity can be resolved by translating the results of each technique into a track score (TS) and combining those results into an updated TS. The TS is compared to a threshold to determine whether a hypothesis should be accepted or rejected. A low band pass filter can be used in case there is a large jump in TS values.

At 902, the neural network classifier can generate the probability vector as described above. The neural network classifier can provide a probability score that whether or not the true hypothesis is present in one of the six regions of the mobile device as described above. For, the neural network classifier different hypotheses will fall into different regions due to region partitioning based on PDOA pairing. For example, there may be three hypotheses for a given signal (e.g., one in Region 2, one in Region 5, and one in Region 3). Each one of these hypotheses can receive different probabilities. The regions are fixed for a given device geometry and hypotheses will fall into different regions. The partitioning may satisfy that requirement in the previous flow mode. The partitions can be modified for new form factors of the mobile device to ensure the hypotheses fall into different regions.

Each area of the mobile device can be assigned a track score from the neural network. The neural network may not check the absolute RSSI because the signal strength can depend on several other factors (e.g., the orientation of the device, and the power level of the device). The neural network only uses a base and a refs power between the three antenna chains at the input of the neural network. The absolute power level is not checked.

At 904, the technique can include an RSSI check to determine whether the RSSI indicates that the signal is originated from the front (screen side) or back side (antenna side) of the electronic device. The RSSI check in effect is an absolute power level check. The technique checks if the RSSI is above or below a threshold power level. If the RSSI is below a predefined threshold power level indicating that the signal is not in field of view (FOV) and that the signal originated from the screen side of the mobile device. If the RSSI check is not in the FOV, indicating that the signal originated from the screen side of the device, the probability vector can be overwritten with a value to indicate that the signal originated from the screen side of the device before the vector is sent to the probability to TS translator. In various embodiments, the TS can indicate that there is a 100% probability that the signal indicated from the screen side of the device if the RSSI is below a predetermined threshold value. If the RSSI check is within the FOV indicating that the signal did not originate from the screen side of the device, the probability vector can pass through, at 906, the probability value to TS translator, at 910. Therefore, the neural network output and the RSSI check can be combined together.

At 912, the technique can perform a motion consistency check for a given hypothesis. The system can have a prediction for the hypotheses based on consistent motion information. The mobile device can have a real distance and angular measurements from one or more sensors on the mobile device. The technique can compare the difference in predictions after motion has occurred. If the current distance and angle measurements are very close together and the motion is consistent, the TS prediction value should be higher. If the distance is further, the TS prediction value should be lower.

In one embodiment, the technique can choose the hypothesis that has the closest distance to the predicted location.

At 914, the technique can send the distance to TS translator. The distance is the difference between the prediction and the real measurement for range to the electronic device. The output of the TS translator can be the input to the summation function. The distance can be determined from the following formula:

$$d^2 = (y_k^j - y_k^{-i})^T S_k^{-1} (y_k^j - y_k^{-i})$$

Where $y_k^j$ is the predicted position and $y_k^{-i}$ is the measured location (also known as innovation sequence of the Kalman filter). S is the covariance matric of the innovation sequence accounting for error. In various embodiments, the distance can be a Euclidian distance and S is a measure or the error. Therefore, the distance can be normalized by the uncertainty. Sometimes the distance is large but the uncertainty is also large. Therefore, d provides the normalized distance. The results from this can be used to calculate the change in TS according to the equation:

$$\Delta TS(k) = -\log \sqrt{|S|} - d^2$$

Because of the minus signs in the equation, the smaller the distance, the larger the score. A smaller distance would result in a larger score. The change in track score for a given neural network AoA hypothesis can be given by the following formula:

$$\Delta TS = p(r) * scale$$

Where p can be the probability that the angle of arrival is in a particular region r. The scale can be device and region dependent constant. Different devices can have different antenna geometry which directly impacts the performance of the neural network. The central region (Region 2) is better than other regions. Therefore, region 2 has higher scale than other regions. The scale can be empirically derived to provide the best, most consistent results.

The motion consistency check results 912 can be sent to the distance to TS translator 914 for processing.

At 916, the channel diversity check can be processed and at 916, the inter-channel difference can be sent, at 918, to TS translator. The wireless signals (e.g., UWB signal) can operate on a plurality of channels, each channel having a unique frequency. In various embodiments, the UWB transceiver for the mobile device can operate on two channels (e.g., 6.5 GHz (Channel 5) and 8.0 GHz (Channel 9). From an AoA accuracy perspective, channel 9 is more accurate than Channel 5. Channel 9 can be the primary frequency channel. Ranging accuracy is also better for channel 9. During the channel diversity check, the channels are allocated in an asymmetric way, such that for every six ranging cycles only one of them is on channel 5 and the remaining are on channel 9. The channel 5 measurements may be used only for resolving ambiguity while the channel 9 measurements may be used for driving EKF measurement updates.

The channel diversity check can compare a channel 9 hypothesis with a channel 5 hypothesis. The hypothesis will not match perfectly because the range and AoA measurements are not perfect for each channel. The difference of the genuine tracking targets between channels can be 0-30 degrees. An adjustment to TS can be determined from the channel diversity check.

At 918, the inter-channel difference adjustment can be provided to the TS translator. The TS translator can convert the incoming scores from the neural network and RSSI check and translate the score to ensure that the each TS is based on a consistent scale. The output of the TS translator 910 can be a scalar score indicating the probability that a particular hypothesis is within one of the six regions of the electronic device.

At 920, the summing function can calculate sum the motion consistency check adjustment, the neural network/RSSI adjustment, and the inter-channel TS adjustment to determine a delta track score (ΔTS).

Figure 10:
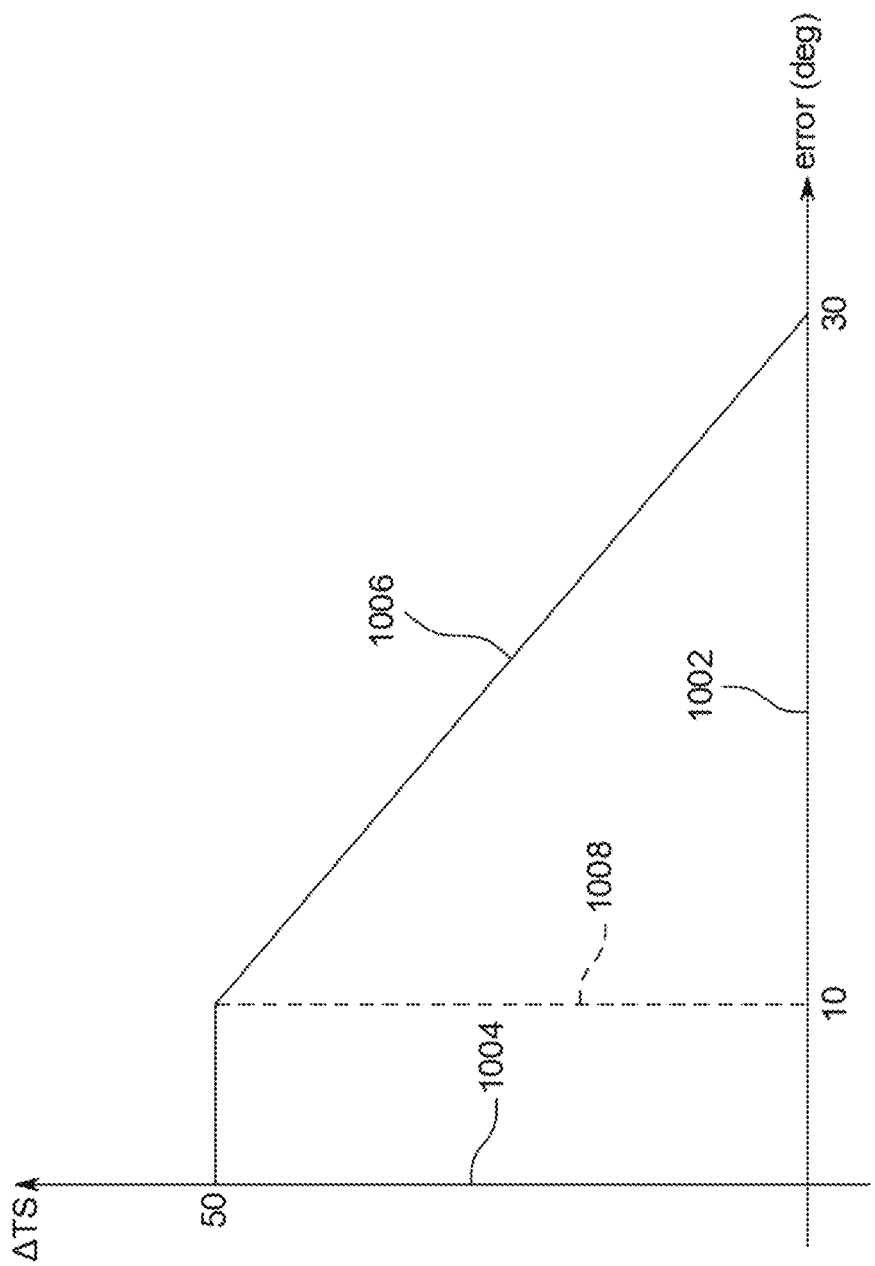
FIG. 10 illustrates a chart for a plot for determining track score based at least in part on inter-channel angle error.

FIG. 10 illustrates how the channel diversity results can be converted to a change in TS. The change in TS is shown on the y-axis 1004, while the inter-channel diversity angle error is shown on the x-axis 1002. The inter-channel diversity angle error can be the difference between the channel 9 hypothesis and the channel 5 hypothesis. The inter-channel diversity angle error can be used as the input. The line 1006 shows that when the angle error is less than or equal to 10 degrees, the technique considers the channels as perfectly matched providing the change in TS can be a fixed amount (e.g., 50) based on empirical data results. The change in TS can linearly decrease to 0 as the inter-channel angle error increases from 10 degrees to 30 degrees. If the angle error is above 30 degrees the change in TS can be zero. The decrease in TS can also be non-linear in various embodiments.

At 1020, after the results are translated, the results can be summed and the TS can be updated, at 1022, according to the following formula:

$$TS = 0.9 * TS + 0.1 * \Delta TS$$

If the TS is above a confirmation threshold, then the AoA can be confirmed to originate from the back side of the device and if the TS is below the deletion threshold then the targets can be deleted. Results between the two thresholds are tentative and can be updated until they pass either the confirmation or deletion threshold. If there is only one confirmed tracking target, then that target is reported as the sensor fusion output, but if there is no confirmed tracking target, no sensor fusion solution is output. Additionally, if more than one confirmed tracking target exist, then the tracking target with the longest tracking time is reported as the sensor fusion output. However, if multiple targets share the longest tracking time, no sensor fusion output is reported. For example, if one track score has been reported for approximately 30 posts and another one may only be reported in 5 memory updates, the track score with 30 posts may be updated.

For example, in various embodiments, the confirmation threshold can be 60. If one tracks score is 70 and the other track score is 300 both may be confirmed. However, the scores are much different, the one with the highest track score (e.g., 300) will be reported.

III. Angle of Arrival Disambiguation

As discussed above, a mobile device can be used to determine the angle of arrival for a signal received from an electronic device. The electronic device can be a tag used to track personal items or other small objects. A flowchart of an example technique and schematic are discussed below.

A. AoA Disambiguation Flow

Figure 11:
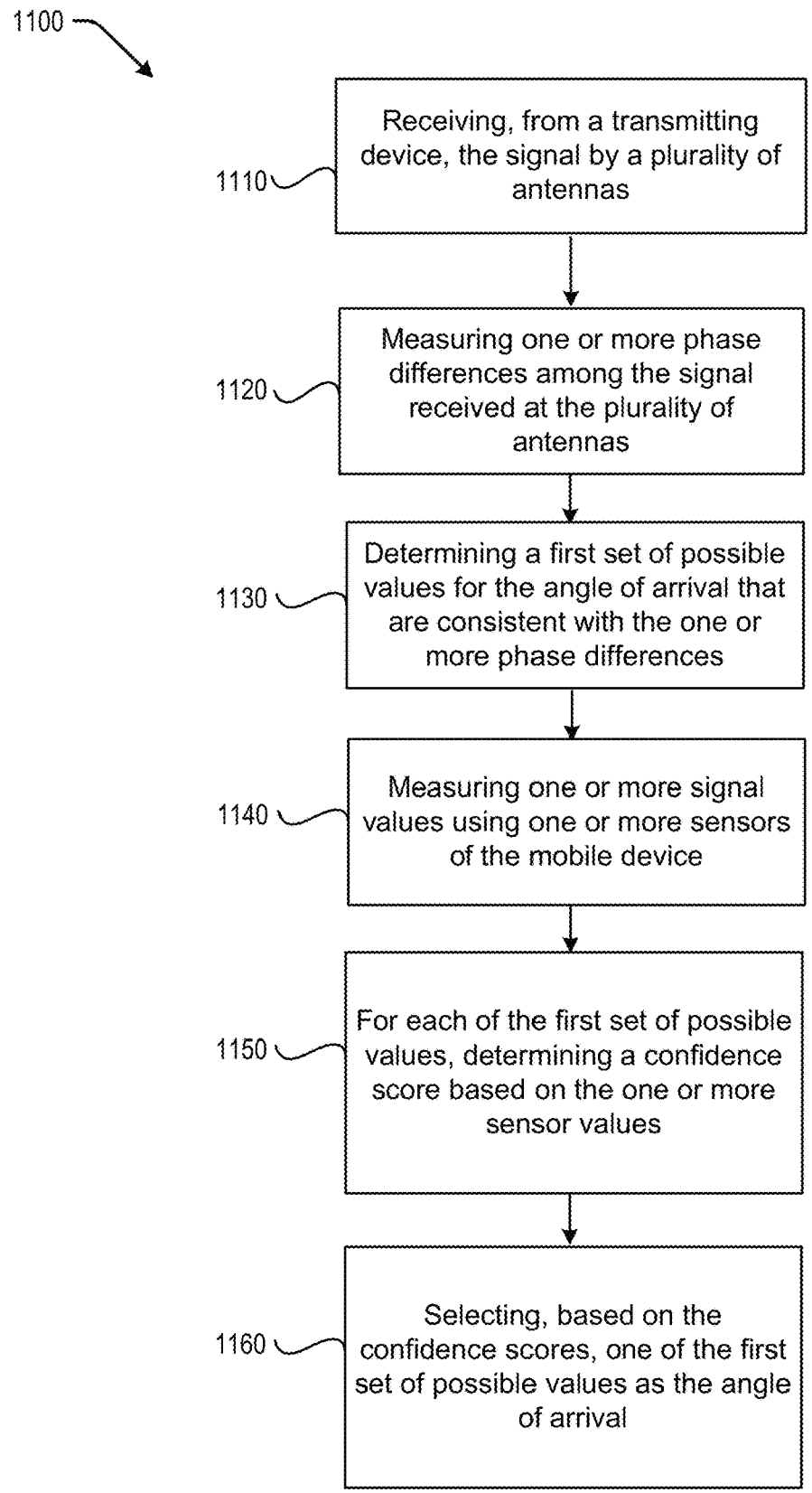
FIG. 11 illustrates a flow chart for a technique for determining angle of arrival.

FIG. 11 is a flowchart of an example process 1100 associated with techniques to disambiguate angle of arrival. In some implementations, one or more process blocks of FIG. 11 may be performed by an electronic device (e.g., mobile device 1500 of FIG. 15). In some implementations, one or more process blocks of FIG. 11 may be performed by another device or a group of devices separate from or including the mobile device 1500. Additionally, or alternatively, one or more process blocks of FIG. 11 may be performed by one or more components of device 1500, such as processor 1518, computer readable medium 1502, input/output subsystem 1506, wireless circuitry 1508, GPS unit 1548, location/motion module 1526, applications 1554, and/or ranging module 1528.

At 1110, the process 1100 can include receiving a signal transmitted by a transmitting device by a plurality of antennas on a mobile device. The antennas can be a radio frequency antenna including wideband or ultra wideband antennas. The antennas can be separated from each other on one side of a mobile device by a fixed distance.

At 1120, the process 1100 can include measuring the one or more phase differences among the signal received at the plurality of antennas. As the antennas are a fixed distance apart from each other, each antenna can receive the same wireless signal at different times and at different phases. The time(s) of arrival of the signal and the phase of arrival for each antenna can be measured by the transceiver and stored in a memory of the mobile device.

At 1130, the process 1100 can include determining a first set of possible values for the angle of arrival that are consistent with the one or more measured phase differences. The one or more signal values can be measured using the one or more sensors (e.g., accelerometer, gyroscope, etc.) of the electronic device. The sensors of the electronic device can include motion sensors, optical sensors, or cameras.

At 1140, the process 1100 can include measuring one or more signal values using the one or more sensors of the electronic device. The one or more signal values can be measured using the one or more sensors (e.g., accelerometer, gyroscope, etc.) of the electronic device. The sensors of the electronic device can include motion sensors, optical sensors, or cameras.

In various embodiments, the one or more sensors can include the plurality of antennas. The process 1100 can include determining, using a machine learning model and antenna measurements of the signal, a probability vector for each of the first set of possible values. Each probability of the probability vector corresponding to a region of a plurality of regions around the electronic device. The process 1100 can determine a confidence score for a respective possible value using the probability vector for the respective possible value.

In various embodiments, the process 1100 can include measuring a power level of the signal, the power level of the signal being one of the one or more signal values. The process 1100 can include comparing the power level of the signal to a threshold power level value. The confidence score for at least one of plurality of possible values can be determined based on the power level of the signal being below the threshold power level value.

In various embodiments, the process 1100 can include determining a motion of the electronic device over a period of time using the one or more signal values. For each of the first set of possible values, the process 1100 can include predicting an angle of the signal at a first time based on the motion. The process 1100 can include determining a first angle of the signal at the first time based on one or more additional phase differences measured at the first time. The confidence score for a respective possible value can be determined based on a difference between the predicted angle and the first angle for the respective possible value.

In various embodiments, the process 1100 can include receiving a second signal by the plurality of antennas. The second signal can be transmitted over a second frequency. The process 1100 can include measuring one or more second phase differences among the second signal received at the plurality of antennas. The one or more second phase differences can be the one or more signal values. The process 1100 can include determining a second set of possible values for the angle of arrival that are consistent with the one or more second phase differences. For each of the first set of possible values, the process 1100 can include determining a difference between a respective possible value and one of the second set of possible values. The confidence score for a respective possible value can be determined based on the difference for the respective possible value.

At 1150, the process 1100 can include selecting, based on the confidence scores, one of the first set of possible values as the angle of arrival. In various embodiments, the angle of arrival can be determined based in part on a first phase difference of arrival at a first antenna and a second phase difference of arrival at a second antenna.

In various embodiments, a mobile device can include one or more memories and one or more processors in communication with the one or more memories and configured to execute instructions stored in the one or more memories to performing operations of a method described above.

In various embodiments, a computer-readable medium may store a plurality of instructions that, when executed by one or more processors of a computing device, cause the one or more processors to perform operations of any of the methods described above.

Although FIG. 11 shows example steps of process 1100, in some implementations, process 1100 can include additional steps, fewer steps, different steps, or differently arranged steps than those depicted in FIG. 11. Additionally, or alternatively, two or more of the steps of process 1100 can be performed in parallel.

B. AoA Disambiguation Schematic

Figure 12:
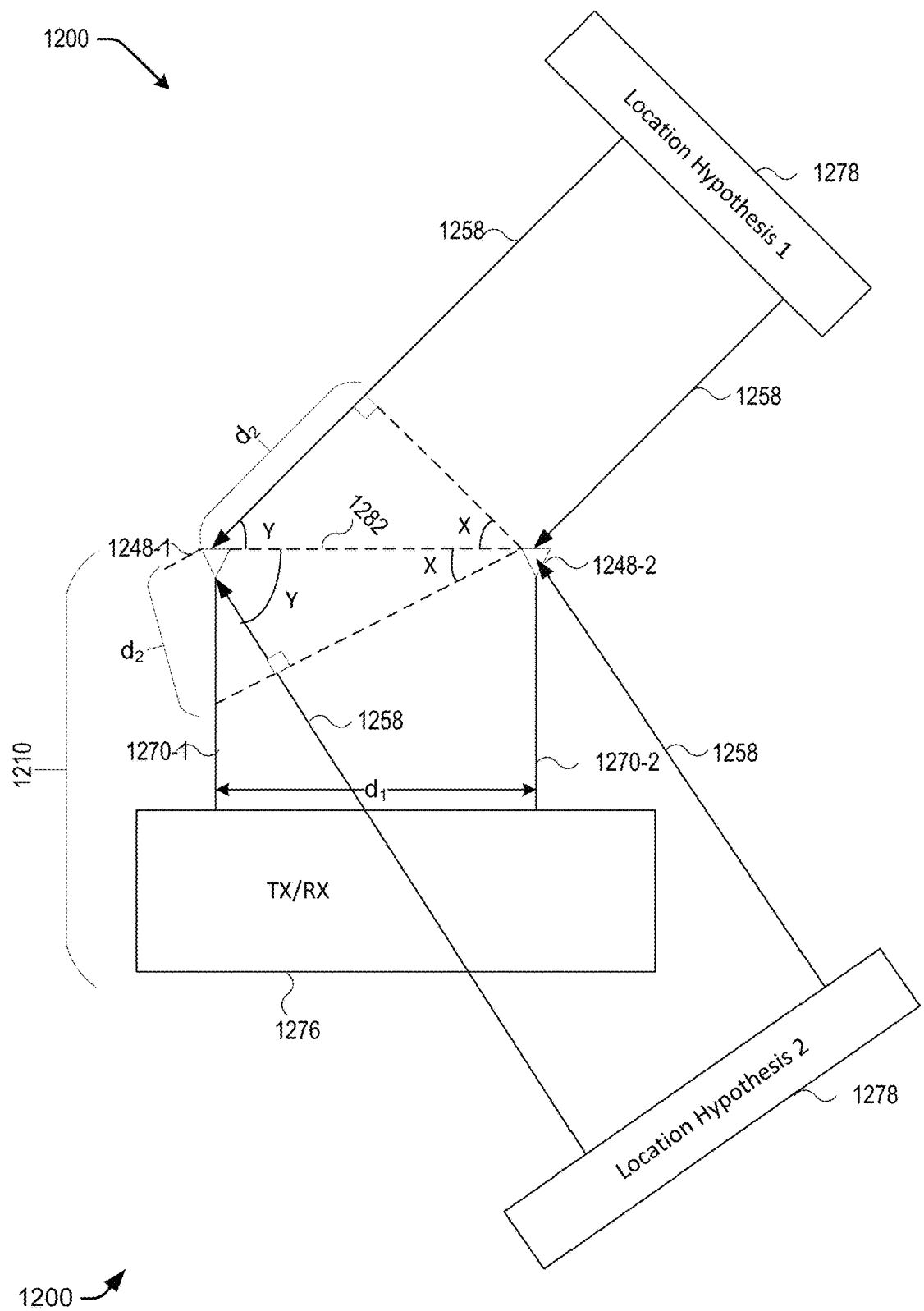
FIG. 12 is a schematic diagram showing angle of arrival measurement techniques.

FIG. 12 is a schematic diagram 1200 showing how angle of arrival measurement techniques may be used to determine the orientation of device 1210 relative to nodes 1278. The term "node" may be used to refer to an electronic device, an object without electronics, and/or a particular location. In some arrangements, nodes may be associated with a mapped environment (e.g., the term node may refer to a device, object, or location in a mapped environment). Devices 1210 may have control circuitry that determines where other nodes are located relative to device 1210. The control circuitry in device 1210 may synthesize information from cameras, motion sensors, wireless circuitry such as antennas, and other input-output circuitry to determine how far a node is relative to device 1210 and/or to determine the orientation of device 1210 relative to that node. The control circuitry may use output components in device 1210 to provide output (e.g., display output, audio output, haptic output, or other suitable output) to a user of device 1210 based on the position of the node. The control circuitry may, for example, use antenna signals and motion data to determine the angle of arrival of signals from other electronic devices to thereby determine the locations of those electronic devices relative to the user's electronic device.

As shown in FIG. 12, device 1210 may include multiple antennas (e.g., a first antenna 1248-1 and a second antenna 1248-2) coupled to transceiver circuitry 1276 by respective transmission lines 1270 (e.g., a first transmission line 1270-1 and a second transmission line 1270-2). Antennas 1248-1 and 1248-2 may each receive a wireless signal 1258 from node 1278. Antennas 1248-1 and 1248-2 may be laterally separated by a distance $d_1$, where antenna 1248-1 is farther away from node 1278 than 1248-2 (in the example of FIG. 12). Therefore, wireless communications signal 1258 travels a greater distance to reach antenna 1248-1 than 1248-2. The additional distance between node 1278 and antenna 1248-1 is shown in FIG. 12 as distance $d_2$. FIG. 12 also shows angles x and y (where x+y=90°).

Distance $d_2$ may be determined as a function of angle γ or angle x (e.g., $d_2=d_1 \sin(x)$ or $d_2=d_1 \cos(y)$). Distance d2 may also be determined as a function of the phase difference between the signal received by antenna 1248-1 and the signal received by antenna 1248-2 (e.g., $d_2=(\Delta\phi\lambda)/(2\pi)$, where Δφ is the phase difference between the signal received by antenna 1248-1 and the signal received by antenna 1248-2 and λ is the wavelength of the received signal 1258). Device 1210 may have phase measurement circuitry coupled to each antenna to measure the phase of the received signals and identify a difference in the phases (Δφ). The two equations for $d_2$ may be set equal to each other (e.g., $d_1 \sin(x)=(\Delta\phi\lambda)/(2\pi)$ and rearranged to solve for angle x (e.g., x=sin−1 $(\Delta\phi\lambda)/(2\pi d_1)$) or may be rearranged to solve for angle γ. As such, the angle of arrival may be determined (e.g., by control circuitry) based on the known (predetermined) distance between antennas 1248-1 and 1248-2, the detected (measured) phase difference between the signal received by antenna 1248-1 and the signal received by antenna 1248-2, and the known wavelength or frequency of the received signals 1258.

Distance $d_1$ may be selected to ease the calculation for phase difference between the signal received by antenna 1248-1 and the signal received by antenna 1248-2. For example, $d_1$ may be less than or equal to one-half of the wavelength (e.g., effective wavelength) of the received signals 1258 (e.g., to avoid multiple phase difference solutions).

Some antenna arrangements may be sufficient for resolving the "complete" angle of arrival of signals 1258 without ambiguity. A complete angle of arrival (sometimes referred to as the direction of arrival) includes an azimuth angle θ and an elevation angle γ of node 1278 relative to device 1200.

Antennas that are located in a three-dimensional arrangement (e.g., spanning multiple planes) may be sufficient to determine the complete angle of arrival of signals 1258 without ambiguity. However, when the baseline vectors (i.e., the vectors that extend between respective pairs of antennas) are all located in one plane, there may be some ambiguity as to the correct azimuth angle θ and/or the correct elevation angle γ of signals 1258. In the two-antenna arrangement of FIG. 12, for example, there is only one baseline vector 1282, which yields an accurate, unambiguous azimuth angle θ, but may not provide sufficient information to determine elevation angle φ. Thus, node 1278' with a different elevation angle may nonetheless produce signals 1258' with the same phase difference Δφ between the signal received by antenna 1248-1 and the signal received by antenna 1248-2 as signals 1258. In other words, different directions of arrival may result in the same phase difference. This leads to an ambiguity in the angle of arrival solution. Without other information, control circuitry may be able to determine the azimuth angle θ of signals 1258, but may be unable to determine elevation angle γ of signals 1258. Systems with three or more coplanar antennas will resolve some but not all ambiguities in the angle of arrival because the baseline vectors will still be located in the same plane.

To help resolve ambiguities in the complete angle of arrival, control circuitry may combine antenna signals with motion data gathered using motion sensor circuitry. In particular, control circuitry may obtain angle of arrival measurements (e.g., measurements of azimuth angle θ and/or elevation angle φ) while device 1210 is in multiple different positions. At each position, antennas 1248 may receive signals 1258 from node 1278 and control circuitry may determine the possible angle of arrival solutions based on the phase difference between signals received by antenna 1248-1 and signals received by antenna 1248-2. Motion sensor circuitry may track the movement of device 1210 as it is moved from one position to another. Using the motion data from motion sensor circuitry, control circuitry may associate each set of angle of arrival solutions with a different baseline vector 1282. The baseline vectors may span multiple planes, thus providing sufficient information for control circuitry to determine the correct angle of arrival, just as if device 1210 had a multi-planar antenna arrangement.

It should be understood that using a horizontal coordinate system and representing the complete angle of arrival with azimuth and elevation angles is merely illustrative. If desired, a Cartesian coordinate system may be used and the angle of arrival may be expressed using a unit direction vector that is represented using x, y, and z coordinates. Other coordinate systems may also be used. A horizontal coordinate system is sometimes described herein as an illustrative example.

IV. Electronic Device for Performing Communications

Figure 13:
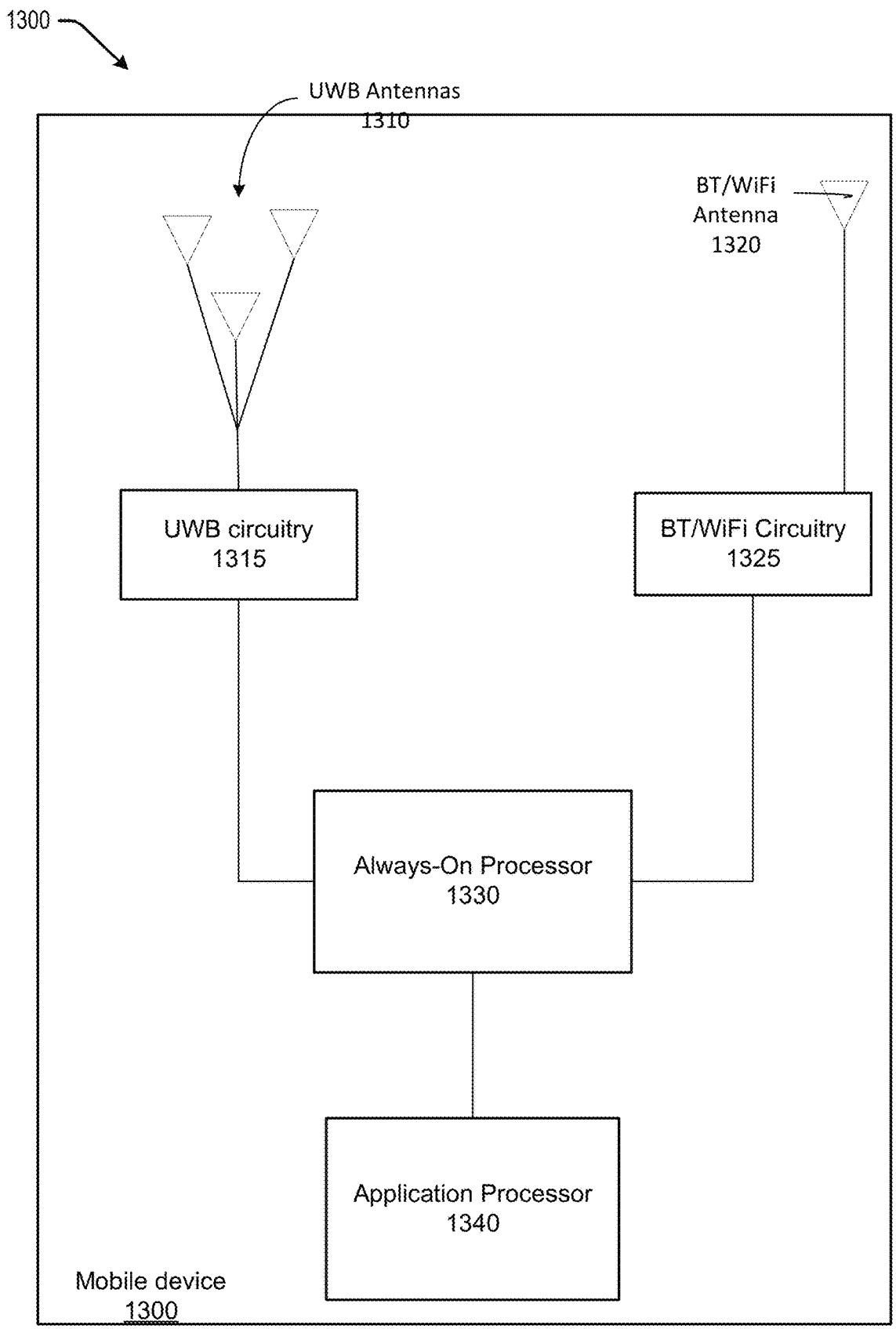
FIG. 13 is a block diagram of components of an electronic device operable to perform ranging according to embodiments of the present disclosure.

FIG. 13 is a block diagram of components of a mobile device 1300 operable to perform passive beacon communication techniques according to embodiments of the present disclosure. Mobile device 1300 includes antennas for at least two different wireless protocols, as described above. The first wireless protocol (e.g., Bluetooth) may be used for authentication and exchanging ranging settings. The second wireless protocol (e.g., UWB) may be used for performing ranging with another mobile device.

As shown, mobile device 1300 includes UWB antennas 1310 for performing ranging. UWB antennas 1310 are connected to UWB circuitry 1315 for analyzing detected signals from UWB antennas 1310. In some embodiments, mobile device 1300 includes three or more UWB antennas, e.g., for performing triangulation. The different UWB antennas can have different orientations, e.g., two in one direction and a third in another direction. The orientations of the UWB antennas can define a field of view for ranging. As an example, the field of view can span 120 degrees. Such regulation can allow a determination of which direction a user is pointing a device relative to one or more other nearby devices. The field of view may include any one or more of pitch, yaw, or roll angles.

UWB circuitry 1315 can communicate with an always-on processor (AOP) 1330, which can perform further processing using information from UWB messages. For example, AOP 1330 can perform the ranging calculations using timing data provided by UWB circuitry 1315. AOP 1330 and other circuits of the device can include dedicated circuitry and/or configurable circuitry, e.g., via firmware or other software.

As shown, mobile device 1300 also includes Bluetooth (BT)/Wi-Fi antenna 1320 for communicating data with other devices. Bluetooth (BT)/Wi-Fi antenna 1320 is connected to BT/Wi-Fi circuitry 1325 for analyzing detected signals from BT/Wi-Fi antenna 1320. For example, BT/Wi-Fi circuitry 1325 can parse messages to obtain data (e.g., an authentication tag), which can be sent on to AOP 1330. In some embodiments, AOP 1330 can perform authentication using an authentication tag. Thus, AOP 1330 can store or retrieve a list of authentication tags for which to compare a received tag against, as part of an authentication process. In some implementations, such functionality could be achieved by BT/Wi-Fi circuitry 1325.

In other embodiments, UWB circuitry 1315 and BT/Wi-Fi circuitry 1325 can alternatively or in addition be connected to application processor 1340, which can perform similar functionality as AOP 1330. Application processor 1340 typically requires more power than AOP 1330, and thus power can be saved by AOP 1330 handling certain functionality, so that application processor 1340 can remain in a sleep state, e.g., an off state. As an example, application processor 1340 can be used for communicating audio or video using BT/Wi-Fi, while AOP 1330 can coordinate transmission of such content and communication between UWB circuitry 1315 and BT/Wi-Fi circuitry 1325. For instance, AOP 1330 can coordinate timing of UWB messages relative to BT advertisements.

Coordination by AOP 1330 can have various benefits. For example, a first user of a sending device may want share content with another user, and thus ranging may be desired with a receiving device of this other user. However, if many people are in the same room, the sending device may need to distinguish a particular device among the multiple devices in the room, and potentially determine which device the sending device is pointing to. Such functionality can be provided by AOP 1330. In addition, it is not desirable to wake up the application processor of every other device in the room, and thus the AOPs of the other devices can perform some processing of the messages and determine that the destination address is for a different device.

To perform ranging, BT/Wi-Fi circuitry 1325 can analyze an advertisement signal from another device to determine that the other device wants to perform ranging, e.g., as part of a process for sharing content. BT/Wi-Fi circuitry 1325 can communicate this notification to AOP 1330, which can schedule UWB circuitry 1315 to be ready to detect UWB messages from the other device.

For the device initiating ranging, its AOP can perform the ranging calculations. Further, the AOP can monitor changes in distance between the other devices. For example, AOP 1330 can compare the distance to a threshold value and provide an alert when the distance exceeds a threshold, or potentially provide a reminder when the two devices become sufficiently close. An example of the former might be when a parent wants to be alerted when a child (and presumably the child's device) is too far away. An example of the latter might be when a person wants to be reminded to bring up something when talking to a user of the other device. Such monitoring by the AOP can reduce power consumption by the application processor.

V. Example Electronic Device

Figure 14:
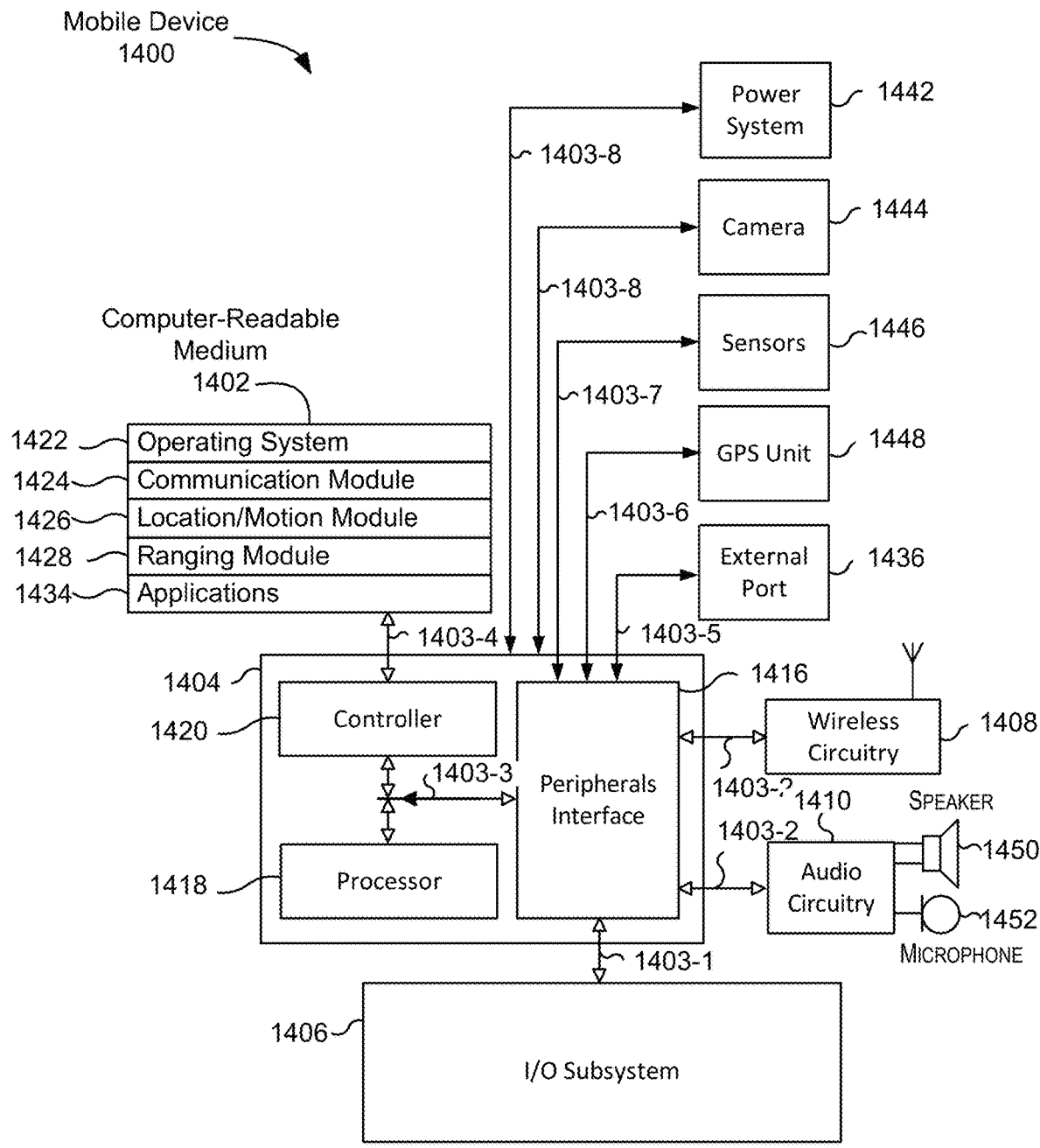
FIG. 14 is block diagram of an example device according to embodiments of the present disclosure.

FIG. 14 is a block diagram of an example electronic device 1400. Device 1400 generally includes computer-readable medium 1402, control circuitry 1404, an Input/Output (I/O) subsystem 1406, wireless circuitry 1408, and audio circuitry 1410 including speaker 1450 and microphone 1452. These components may be coupled by one or more communication buses or signal lines 1403. Device 1400 can be any portable electronic device, including a handheld computer, a tablet computer, a mobile phone, laptop computer, tablet device, media player, personal digital assistant (PDA), a key fob, a car key, an access card, a multifunction device, a mobile phone, a portable gaming device, a headset, or the like, including a combination of two or more of these items.

It should be apparent that the architecture shown in FIG. 14 is only one example of an architecture for device 1400, and that device 1400 can have more or fewer components than shown, or a different configuration of components. The various components shown in FIG. 14 can be implemented in hardware, software, or a combination of both hardware and software, including one or more signal processing and/or application specific integrated circuits.

Wireless circuitry 1408 is used to send and receive information over a wireless link or network to one or more other devices' conventional circuitry such as an antenna system, a radio frequency (RF) transceiver, one or more amplifiers, a tuner, one or more oscillators, a digital signal processor, a CODEC chipset, memory, etc. Wireless circuitry 1408 can use various protocols, e.g., as described herein. In various embodiments, wireless circuitry 1408 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), Long-term Evolution (LTE)-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 1408 is coupled to control circuitry 1404 via peripherals interface 1416. Peripherals interface 1416 can include conventional components for establishing and maintaining communication between peripherals and. Voice and data information received by wireless circuitry 1408 (e.g., in speech recognition or voice command applications) is sent to one or more processors 1418 via peripherals interface 1416. One or more processors 1418 are configurable to process various data formats for one or more application programs 1434 stored on medium 1402.

Peripherals interface 1416 couple the input and output peripherals of device 1400 to the one or more processors 1418 and computer-readable medium 1402. One or more processors 1418 communicate with computer-readable medium 1402 via a controller 1420. Computer-readable medium 1402 can be any device or medium that can store code and/or data for use by one or more processors 1418. Computer-readable medium 1402 can include a memory hierarchy, including cache, main memory, and secondary memory. The memory hierarchy can be implemented using any combination of RAM (e.g., Standard Random Access Memory (SRAM), Dynamic Random Access Memory (DRAM), Double Data Random Access Memory (DDRAM), Read only Memory (ROM), FLASH, magnetic and/or optical storage devices, such as disk drives, magnetic tape, CDs (compact disks) and DVDs (digital video discs)). In some embodiments, peripherals interface 1416, one or more processors 1418, and controller 1420 can be implemented on a single chip, such as control circuitry 1404. In some other embodiments, they can be implemented on separate chips.

Processor(s) 1418 can include hardware and/or software elements that perform one or more processing functions, such as mathematical operations, logical operations, data manipulation operations, data transfer operations, controlling the reception of user input, controlling output of information to users, or the like. Processor(s) 1418 can be embodied as one or more hardware processors, microprocessors, microcontrollers; field programmable gate arrays (FPGAs), application-specified integrated circuits (ASICs), or the like.

Device 1400 may include storage and processing circuitry such as control circuitry 1404. Control circuitry 1404 may include storage such as hard disk drive storage, nonvolatile memory (e.g., flash memory or other electrically-programmable-read-only memory configured to form a solid-state drive), volatile memory (e.g., static or dynamic random-access-memory), etc. Processing circuitry in control circuitry 1404 may be used to control the operation of device 1400. This processing circuitry may be based on one or more microprocessors, microcontrollers, digital signal processors, baseband processor integrated circuits, application specific integrated circuits, etc.

Control circuitry 1404 may be used to run software on device 1400, such as internet browsing applications, voice-over-internet-protocol (VOIP) telephone call applications, email applications, media playback applications, operating system functions, etc. To support interactions with external equipment, control circuitry 1404 may be used in implementing communications protocols. Communications protocols that may be implemented using control circuitry 1404 include internet protocols, wireless local area network protocols (e.g., IEEE 802.11 protocols—sometimes referred to as Wi-Fi®), protocols for other short-range wireless communications links such as the Bluetooth® protocol, cellular telephone protocols, multiple-input and multiple-output (MIMO) protocols, antenna diversity protocols, satellite navigation system protocols, millimeter wave communications protocols, IEEE 802.15.4 ultra-wideband communications protocols, etc.

Device 1400 may include input/output subsystem 1406. Input/output subsystem 1406 may include input-output devices. Input/output devices may be used to allow data to be supplied to device 1400 and to allow data to be provided from device 1400 to external devices. Input/output devices may include user interface devices, data port devices, and other input-output components. For example, input/output devices may include one or more displays (e.g., touch screens or displays without touch sensor capabilities), one or more image sensors 1444 (e.g., digital image sensors), motion sensors, and speakers 1450. Input-output device may also include buttons, joysticks, scrolling wheels, touch pads, key pads, keyboards, microphones 1452, haptic elements such as vibrators and actuators, status indicators, light sources, audio jacks and other audio port components, digital data port devices, light sensors, capacitance sensors, proximity sensors (e.g., a capacitive proximity sensor and/or an infrared proximity sensor), magnetic sensors, and other sensors and input-output components.

Device 1400 also includes a power system 1442 for powering the various hardware components. Power system 1442 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1400 includes an image sensor 1444 (e.g., a camera). In some embodiments, device 1400 includes sensors 1446. Sensors can include accelerometers, compass, gyrometer, pressure sensors, audio sensors, light sensors, barometers, and the like. Sensors 1446 can be used to sense location aspects, such as auditory or light signatures of a location.

In some embodiments, device 1400 can include a Global Positioning System (GPS) receiver, sometimes referred to as a GPS unit 1448. A mobile device can use a satellite navigation system, such as the GPS, to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1418 run various software components stored in medium 1402 to perform various functions for device 1400. In some embodiments, the software components include an operating system 1422, a communication module 1424 (or set of instructions), a location module 1426 (or set of instructions), a ranging module 1428 that is used as part of ranging operation described herein, and other application programs 1434 (or set of instructions).

Operating system 1422 can be any suitable operating system, including iOS, Mac OS, Darwin, Quatros Real-Time Operating System (RTXC), LINUX, UNIX, OS X, WINDOWS, or an embedded operating system such as VxWorks. The operating system can include various procedures, sets of instructions, software components, and/or drivers for controlling and managing general system tasks (e.g., memory management, storage device control, power management, etc.) and facilitates communication between various hardware and software components.

Communication module 1424 facilitates communication with other devices over one or more external ports 1436 or via wireless circuitry 1408 and includes various software components for handling data received from wireless circuitry 1408 and/or external port 1436. External port 1436 (e.g., universal serial bus (USB), FireWire, Lightning connector, 60-pin connector, etc.) is adapted for coupling directly to other devices or indirectly over a network (e.g., the Internet, wireless local area network (LAN), etc.).

Location/motion module 1426 can assist in determining the current position (e.g., coordinates or other geographic location identifiers) and motion of device 1400. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1426 receives data from GPS unit 1448 and analyzes the signals to determine the current position of the mobile device. In some embodiments, location/motion module 1426 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1408 and is passed to location/motion module 1426. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1400 based on the position coordinates of the corresponding transmitters. Regardless of the specific location technology used, location/motion module 1426 receives information from which a location fix can be derived, interprets that information, and returns location information, such as geographic coordinates, latitude/longitude, or other location fix data.

Ranging module 1428 can send/receive ranging messages to/from an antenna, e.g., connected to wireless circuitry 1408. The messages can be used for various purposes, e.g., to identify a sending antenna of a device, determine timestamps of messages to determine a distance of mobile device 1400 from another device. Ranging module 1428 can exist on various processors of the device, e.g., an always-on processor (AOP), a UWB chip, and/or an application processor. For example, parts of ranging module 1428 can determine a distance on an AOP, and another part of the ranging module can interact with a sharing module, e.g., to display a position of the other device on a screen in order for a user to select the other device to share a data item. Ranging module 1428 can also interact with a reminder module that can provide an alert based on a distance from another mobile device.

Dielectric-filled openings such as plastic-filled openings may be formed in metal portions of housing such as in metal sidewall structures (e.g., to serve as antenna windows and/or to serve as gaps that separate portions of antennas from each other).

Antennas may be mounted in housing. If desired, some of the antennas (e.g., antenna arrays that may implement beam steering, etc.) may be mounted under dielectric portions of device 1400 (e.g., portions of the display cover layer, portions of a plastic antenna window in a metal housing sidewall portion of housing, etc.). With one illustrative configuration, some or all of rear face of device 1400 may be formed from a dielectric. For example, the rear wall of housing may be formed from glass plastic, ceramic, other dielectric. In this type of arrangement, antennas may be mounted within the interior of device 1400 in a location that allows the antennas to transmit and receive antenna signals through the rear wall of device 1400 (and, if desired, through optional dielectric sidewall portions in housing). Antennas may also be formed from metal sidewall structures in housing and may be located in peripheral portions of device 1400.

To avoid disrupting communications when an external object such as a human hand or other body part of a user blocks one or more antennas, antennas may be mounted at multiple locations in housing. Sensor data such as proximity sensor data, real-time antenna impedance measurements, signal quality measurements such as received signal strength information, and other data may be used in determining when one or more antennas is being adversely affected due to the orientation of housing, blockage by a user's hand or other external object, or other environmental factors. Device 1400 can then switch one or more replacement antennas into use in place of the antennas that are being adversely affected.

Antennas may be mounted at the corners of housing, along the peripheral edges of housing, on the rear of housing, under the display cover layer that is used in covering and protecting display on the front of device 1400 (e.g., a glass cover layer, a sapphire cover layer, a plastic cover layer, other dielectric cover layer structures, etc.), under a dielectric window on a rear face of housing or the edge of housing, under a dielectric rear wall of housing, or elsewhere in device 1400. As an example, antennas may be mounted at one or both ends of device 1400 (e.g., along the upper and lower edges of housing, at the corners of housing, etc.).

Antennas in device 1400 may include cellular telephone antennas, wireless local area network antennas (e.g., Wi-Fi® antennas at 2.4 GHz and 5 GHz and other suitable wireless local area network antennas), satellite navigation system signals, and near-field communications antennas. The antennas may also include antennas that support IEEE 802.15.4 ultra-wideband communications protocols and/or antennas for handling millimeter wave communications. For example, the antennas may include two or more ultra-wideband frequency antennas and/or millimeter wave phased antenna arrays. Millimeter wave communications, which are sometimes referred to as extremely high frequency (EHF) communications, involve signals at 60 GHz or other frequencies between about 10 GHz and 400 GHz.

Wireless circuitry in device 1400 may support communications using the IEEE 802.15.4 ultra-wideband protocol. In an IEEE 802.15.4 system, a pair of devices may exchange wireless time stamped messages. Time stamps in the messages may be analyzed to determine the time of flight of the messages and thereby determine the distance (range) between the devices.

Image sensors 1444 may include one or more visible digital image sensors (visible-light cameras) and/or one or more infrared digital image sensors (infrared-light cameras). Image sensors 1444 may, if desired, be used to measure distances. For example, an infrared time-of-flight image sensor may be used to measure the time that it takes for an infrared light pulse to reflect back from objects in the vicinity of device 1400, which may in turn be used to determine the distance to those objects. Visible imaging systems such as a front and/or rear-facing camera in device 1400 may also be used to determine the position of objects in the environment. For example, control circuitry 1404 may use image sensors 1444 to perform simultaneous localization and mapping (SLAM). SLAM refers to the process of using images to determine the position of objections in the environment while also constructing a representation of the imaged environment. Visual SLAM techniques include detecting and tracking certain features in images such as edges, textures, room corners, window corners, door corners, faces, sidewalk edges, street edges, building edges, tree trunks, and other prominent features. Control circuitry 1404 may rely entirely upon image sensors 1444 to perform simultaneous localization and mapping, or control circuitry 1404 may synthesize image data with range data from one or more distance sensors (e.g., light-based proximity sensors). If desired, control circuitry 1404 may use display to display a visual representation of the mapped environment.

Input-output devices may include motion sensor circuitry 1446. Motion sensor circuitry 1446 may include one or more accelerometers (e.g., accelerometers that measure acceleration along one, two, or three axes), gyroscopes, barometers, magnetic sensors (e.g., compasses), image sensors (e.g., image sensor 1444) and other sensor structures. Sensors 1446 may, for example, include one or more microelectromechanical systems (MEMS) sensors (e.g., accelerometers, gyroscopes, microphones, force sensors, pressure sensors, capacitive sensors, or any other suitable type of sensor formed using microelectromechanical systems technology).

Control circuitry 1404 may be used to store and process motion sensor data. If desired, motion sensors, processing circuitry, and storage that form motion sensor circuitry may form part of a system-on-chip integrated circuit (as an example).

Input-output devices may include movement generation circuitry. Movement generation circuitry may receive control signals from control circuitry 1404. Movement generation circuitry may include electromechanical actuator circuitry that, when driven, moves device 1400 in one or more directions. For example, movement generation circuitry may laterally move device 1400 and/or may rotate device 1400 around one or more axes of rotation. Movement generation circuitry may, for example, include one or more actuators formed at one or more locations of device 1400. When driven by a motion control signal, actuators may move (e.g., vibrate, pulse, tilt, push, pull, rotate, etc.) to cause device 1400 to move or rotate in one or more directions. The movement may be slight (e.g., not noticeable or barely noticeable to a user of device 1400), or the movement may be substantial. Actuators may be based on one or more vibrators, motors, solenoids, piezoelectric actuators, speaker coils, or any other desired device capable of mechanically (physically) moving device 1400.

Some or all of movement generation circuitry such as actuators may be used to perform operations that are unrelated to rotation of device 1400. For example, actuators may include vibrators that are actuated to issue a haptic alert or notification to a user of device 1400. Such alerts may include, for example, a received text message alert identifying that device 1400 has received a text message, a received telephone call alert, a received email alert, an alarm notification alert, a calendar notification alert, or any other desired notification. By actuating actuator, device 1400 may inform the user of any desired device condition.

Motion sensor circuitry may sense motion of device 1400 that is generated by movement generation circuitry. If desired, motion sensor circuitry may provide feedback signals associated with the sensed motion of device 1400 to movement generation circuitry. Movement generation circuitry may use the feedback signals to control actuation of the movement generation circuitry.

Control circuitry 1404 may use motion sensor circuitry and/or movement generation circuitry to determine the angle of arrival of wireless signals received by device 1400 from another electronic device. For example, control circuitry 1404 may use movement generation circuitry to move device 1400 from one position to another. Motion sensor circuitry may be used to track the movement of device 1400 as it is moved between the different positions. At each position, control circuitry 1404 may receive wireless signals from another electronic device. Control circuitry 1404 may process the received wireless signals together with the motion data from motion sensor circuitry to more accurately determine the position of the other electronic device. The use of motion generation circuitry is merely illustrative, however. If desired, motion sensor circuitry may track movement of device 1400 that is not caused by motion generation circuitry. This may include a user's natural, unprompted movement of device 1400 and/or the user's movement of device 1400 after the user is prompted (by display, audio circuitry 1410, a haptic output device in device 1400, or any other suitable output device) to move device 1400 in a particular fashion.

Other sensors that may be included in input-output devices include ambient light sensors for gathering information on ambient light levels, proximity sensor components (e.g., light-based proximity sensors, capacitive proximity sensors, and/or proximity sensors based on other structures), depth sensors (e.g., structured light depth sensors that emit beams of light in a grid, a random dot array, or other pattern, and that have image sensors that generate depth maps based on the resulting spots of light produced on target objects), sensors that gather three-dimensional depth information using a pair of stereoscopic image sensors, LIDAR (light detection and ranging) sensors, radar sensors, and other suitable sensors.

Input-output circuitry may include wireless communications circuitry for communicating wirelessly with external equipment. Wireless communications circuitry may include radio frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 1408 may include radio-frequency transceiver circuitry for handling various radio-frequency communications bands. For example, wireless circuitry 1408 may include transceiver circuitry.

Transceiver circuitry may be wireless local area network transceiver circuitry. Transceiver circuitry may handle 2.4 GHz and 5 GHz bands for Wi-Fi® (IEEE 802.11) communications and may handle the 2.4 GHz Bluetooth® communications band.

Circuitry may use cellular telephone transceiver circuitry for handling wireless communications in frequency ranges such as a communications band from 700 to 960 MHz, a band from 1710 to 2170 MHz, a band from 2300 to 2700 MHz, other bands between 700 and 2700 MHz, higher bands such as LTE bands 42 and 43 (3.4-3.6 GHz), or other cellular telephone communications bands. Circuitry may handle voice data and non-voice data.

Millimeter wave transceiver circuitry (sometimes referred to as extremely high frequency transceiver circuitry) may support communications at extremely high frequencies (e.g., millimeter wave frequencies such as extremely high frequencies of 10 GHz to 400 GHz or other millimeter wave frequencies). For example, circuitry may support IEEE 802.11ad communications at 60 GHz. Circuitry may be formed from one or more integrated circuits (e.g., multiple integrated circuits mounted on a common printed circuit in a system-in-package device, one or more integrated circuits mounted on different substrates, etc.).

Ultra-wideband transceiver circuitry may support communications using the IEEE 802.15.4 protocol and/or other wireless communications protocols. Ultra-wideband wireless signals may be characterized by bandwidths greater than 500 MHz or bandwidths exceeding 20% of the center frequency of radiation. The presence of lower frequencies in the baseband may allow ultra-wideband signals to penetrate through objects such as walls. Transceiver circuitry may operate in a 2.4 GHz frequency band, a 6.5 GHz frequency band, an 8 GHz frequency band, and/or at other suitable frequencies.

Wireless communications circuitry may include satellite navigation system circuitry such as Global Positioning System (GPS) receiver circuitry for receiving GPS signals at 1475 MHz or for handling other satellite positioning data (e.g., GLONASS signals at 1609 MHz). Satellite navigation system signals for receiver are received from a constellation of satellites orbiting the earth.

In satellite navigation system links, cellular telephone links, and other long-range links, wireless signals are typically used to convey data over thousands of feet or miles. In Wi-Fi® and Bluetooth® links at 2.4 and 5 GHz and other short-range wireless links, wireless signals are typically used to convey data over tens or hundreds of feet. Extremely high frequency (EHF) wireless transceiver circuitry may convey signals over these short distances that travel between transmitter and receiver over a line-of-sight path. To enhance signal reception for millimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of device 1400 can be switched out of use and higher-performing antennas used in their place.

Wireless communications circuitry can include circuitry for other short-range and long-range wireless links if desired. For example, wireless communications circuitry 36 may include circuitry for receiving television and radio signals, paging system transceivers, near field communications (NFC) circuitry, etc.

The one or more applications 1434 on device 1400 can include any applications installed on the device 1400, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or advanced audio codec (AAC) files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations, and the like) on a display surface. In another example, a timer module can be a software timer. The timer module can also be implemented in hardware. The time module can maintain various timers for any number of events.

I/O subsystem 1406 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1406 can include a display and user input devices such as a keyboard, mouse, and/or trackpad. In some embodiments, I/O subsystem 1406 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 1402) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 1406 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1400 can include a touchpad (not shown) for activating or deactivating particular functions. In some embodiments, the touchpad is a touch-sensitive area of the device 1400 that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering, sharing, and use of data available from specific and legitimate sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate another device, and vice versa to control which devices ranging operations may be performed. Further, other uses for personal information data that benefit the user are also contemplated by the present disclosure. For instance, health and fitness data may be shared to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Although the present disclosure has been described with respect to specific embodiments, it will be appreciated that the disclosure is intended to cover all modifications and equivalents within the scope of the following claims.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive or an entire computer system), and may be present on or within different computer program products within a system or network. A computer system may include a monitor, printer, or other suitable display for providing any of the results mentioned herein to a user.

The specific details of particular embodiments may be combined in any suitable manner or varied from those shown and described herein without departing from the spirit and scope of embodiments of the invention.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

All publications, patents, and patent applications cited herein are hereby incorporated by reference in their entirety for all purposes.

What is claimed is:

1. A method for determining an angle of arrival for a signal received by a mobile device with a plurality of antennas, the method comprising:

receiving, from a transmitting device, the signal by the plurality of antennas;

measuring one or more phase differences among the signal received at the plurality of antennas;

determining a first set of possible values for the angle of arrival that are consistent with the one or more phase differences;

measuring one or more signal values using one or more sensors of the mobile device; for each of the first set of possible values, determining a confidence score based on the one or more signal values; and selecting, based on the determined confidence score for each of the first set of possible values, one of the first set of possible values as the angle of arrival, wherein the selecting based on the confidence score for each of the first set of possible values comprises:
comparing the confidence score to a confirmation threshold, wherein a possible value with the confidence score above the confirmation threshold is in a confirmed state; and
selecting the possible value in the confirmed state as the angle of arrival, wherein for multiple possible values in the confirmed state, the possible value is selected if the possible value has a longer tracking time than other possible values in the confirmed state.

2. The method of claim 1, wherein the one or more sensors are the plurality of antennas, the method further comprising:
determining, using a machine learning model and antenna measurements of the signal, a probability vector for the first set of possible values, each probability of the probability vector corresponding to a region of a plurality of regions around the mobile device, wherein the confidence score for a respective possible value is determined using the probability in the probability vector for the respective possible value.

3. The method of claim 2, wherein each region of the plurality of regions is defined by an azimuth and an elevation with respect to a geometry of the mobile device.

4. The method of claim 1, further comprising:
measuring a power level of the signal, the power level of the signal being one of the one or more signal values; and
comparing the power level of the signal to a threshold power level value, wherein the confidence score for at least one of plurality of possible values is determined based on the power level of the signal being below the threshold power level value.

5. The method of claim 1, further comprising:
determining a motion of the mobile device over a period of time using the one or more signal values;
for each of the first set of possible values, predicting an angle of the signal at a first time based on the motion; and
determining a first angle of the signal at the first time based on one or more additional phase differences measured at the first time, wherein the confidence score for a respective possible value is determined based on a difference between the predicted angle and the first angle for the respective possible value.

6. The method of claim 1, further comprising:
receiving a second signal by the plurality of antennas, wherein the second signal is transmitted over a second frequency;
measuring one or more second phase differences among the second signal received at the plurality of antennas, wherein the one or more second phase differences are the one or more signal values;
determining a second set of possible values for the angle of arrival that are consistent with the one or more second phase differences; and
for each of the first set of possible values, determining a difference between a respective possible value and one of the second set of possible values, wherein the confidence score for the respective possible value is determined based on the difference between the respective possible value and the one of the second set of possible values.

7. The method of claim 1, wherein the angle of arrival is determined based in part on a first phase difference of arrival at a first antenna and a second phase difference of arrival at a second antenna.

8. The method of claim 1, wherein the selecting based on the confidence score further comprises:
comparing the confidence score to a deletion threshold wherein a possible value with the confidence score below the deletion threshold is deleted.

9. The method of claim 1, further comprising:
determining, using a machine learning model and antenna measurements of the signal, a probability vector for the first set of possible values, each probability of the probability vector corresponding to a region of a plurality of regions around the mobile device, wherein the confidence score for a respective possible value is determined using the probability in the probability vector for the respective possible value;
measuring a power level of the signal, the power level of the signal being one of the one or more signal values;
comparing the power level of the signal to a threshold power level value, wherein the confidence score for at least one of plurality of possible values is adjusted based on the power level of the signal being below the threshold power level value;
determining a motion of the mobile device over a period of time using the one or more signal values;
for each of the first set of possible values, predicting an angle of the signal at a first time based on the motion;
determining a first angle of the signal at the first time based on one or more additional phase differences measured at the first time, wherein the confidence score for a respective possible value is adjusted based on a difference between the predicted angle and the first angle for the respective possible value;
receiving a second signal by the plurality of antennas, wherein the second signal is transmitted over a second frequency;
measuring one or more second phase differences among the second signal received at the plurality of antennas, wherein the one or more second phase differences are the one or more signal values;
determining a second set of possible values for the angle of arrival that are consistent with the one or more second phase differences; and
for each of the first set of possible values, determining a difference between the respective possible value and one of the second set of possible values, wherein the confidence score for the respective possible value is adjusted based on the difference between the respective possible value and the one of the second set of possible values.

10. The method of claim 1, further comprising:
determining, using a machine learning model and antenna measurements of the signal, a probability vector for the first set of possible values, each probability of the probability vector corresponding to a region of a plurality of regions around the mobile device, wherein the confidence score for a respective possible value is determined using the probability in the probability vector for the respective possible value;
measuring a power level of the signal, the power level of the signal being one of the one or more signal values;
comparing the power level of the signal to a threshold power level value, wherein the confidence score for at least one of plurality of possible values is adjusted based on the power level of the signal being below the threshold power level value;
determining a motion of the mobile device over a period of time using the one or more signal values;
for each of the first set of possible values, predicting an angle of the signal at a first time based on the motion;
determining a first angle of the signal at the first time based on one or more additional phase differences measured at the first time, wherein a first confidence score adjustment value for a respective possible value is determined based on a difference between the predicted angle and the first angle for the respective possible value;
determining a distance to an electronic device;
adjusting the first confidence score adjustment value based at least in part on the determined distance;
receiving a second signal by the plurality of antennas, wherein the second signal is transmitted over a second frequency;
measuring one or more second phase differences among the second signal received at the plurality of antennas, wherein the one or more second phase differences are the one or more signal values;
determining a second set of possible values for the angle of arrival that are consistent with the one or more second phase differences; and
for each of the first set of possible values, determining a difference between a respective possible value and one of the second set of possible values, wherein a second confidence score adjustment value for a respective possible value is determined based on the difference for the respective possible value;
determining a track score difference by adding the first confidence score adjustment value and the second confidence score adjustment value;
determining a final track score by adding an adjusted confidence score with the track score difference; and
determining the angle of arrival based at least in part on the final track score.

11. A method for determining an angle of arrival for a signal received by a mobile device with a plurality of antennas, the method comprising:
receiving, from a transmitting device, the signal by the plurality of antennas;
measuring one or more phase differences among the signal received at the plurality of antennas;
determining a first set of possible values for the angle of arrival that are consistent with the one or more phase differences;
determining, using a machine learning model and antenna measurements of the signal, a probability vector for the first set of possible values that are consistent with the one or more phase differences, each probability of the probability vector corresponding to a region of a plurality of regions around the mobile device;
determining a confidence score for a respective possible value using the probability in the probability vector for the respective possible value, wherein determining the confidence score comprises:
converting the one or more signal values, for each of a plurality of signal values, into a plurality of confidence values;
determining a delta track score comprising a sum of the plurality of confidence values; and
determining a final confidence score based on a track score and the delta track score;
measuring one or more signal values using one or more sensors of the mobile device;
determining a motion of the mobile device over a period of time using the one or more signal values;
for each of the first set of possible values, predicting an angle of the signal at a first time based on the motion; and
determining a first angle of the signal at the first time based on one or more additional phase differences measured at the first time, wherein the confidence score for the respective possible value is adjusted based on a difference between the predicted angle and the first angle for the respective possible value; and
selecting, based on the adjusted confidence score, one of the first set of possible values as the angle of arrival.

12. The method of claim 11, further comprising:
receiving a second signal by the plurality of antennas, wherein the second signal is transmitted over a second frequency;
measuring one or more second phase differences among the second signal received at the plurality of antennas, wherein the one or more second phase differences are the one or more signal values;
determining a second set of possible values for the angle of arrival that are consistent with the one or more second phase differences; and
for each of the first set of possible values, determining a difference between a respective possible value and one of the second set of possible values, wherein the confidence score for a respective possible value is further determined based on the difference for the respective possible value.

13. The method of claim 11, wherein the selecting based on the adjusted confidence score further comprises:
comparing the confidence score to a confirmation threshold and a deletion threshold wherein a possible value with the confidence score above the confirmation threshold is in a confirmed state and the possible value with the confidence score below the deletion threshold is deleted; and
selecting the possible value in the confirmed state as the angle of arrival wherein for multiple possible values in the confirmed state, the possible value is selected if the possible value has a longer tracking time than other possible values in the confirmed state.

14. A non-transitory computer-readable medium storing a plurality of instructions that, when executed by one or more processors of a mobile device with a plurality of antennas, cause the one or more processors to perform operations for determining an angle of arrival for a signal, comprising:
receiving, from a transmitting device, the signal by the plurality of antennas;
measuring one or more phase differences among the signal received at the plurality of antennas;
determining a first set of possible values for the angle of arrival that are consistent with the one or more phase differences;
measuring one or more signal values using one or more sensors of the mobile device;
for each of the first set of possible values, determining a confidence score based on the one or more signal values;
selecting, based on each determined confidence score for each of the first set of possible values, one of the first set of possible values as the angle of arrival;

receiving a second signal by the plurality of antennas, wherein the second signal is transmitted over a second frequency;

measuring one or more second phase differences among the second signal received at the plurality of antennas, wherein the one or more second phase differences are the one or more signal values;

determining a second set of possible values for the angle of arrival that are consistent with the one or more second phase differences; and for each of the first set of possible values, determining a difference between a respective possible value and one of the second set of possible values, wherein the confidence score for the respective possible value is determined based on the difference between the respective possible value and the one of the second set of possible values.

15. The non-transitory computer-readable medium of claim 14, wherein the one or more sensors are the plurality of antennas, the operations further comprising:

determining, using a machine learning model and antenna measurements of the signal, a probability vector for the first set of possible values, each probability of the probability vector corresponding to a region of a plurality of regions around the mobile device, wherein the confidence score for a respective possible value is determined using the probability in the probability vector for the respective possible value.

16. The non-transitory computer-readable medium of claim 14, the operations further comprising:

measuring a power level of the signal, the power level of the signal being one of the one or more signal values; and comparing the power level of the signal to a threshold power level value, wherein the confidence score for at least one of plurality of possible values is determined based on the power level of the signal being below the threshold power level value.

17. The non-transitory computer-readable medium of claim 14, further comprising:

determining a motion of the mobile device over a period of time using the one or more signal values;

for each of the first set of possible values, predicting an angle of the signal at a first time based on the motion; and determining a first angle of the signal at the first time based on one or more additional phase differences measured at the first time, wherein the confidence score for a respective possible value is determined based on a difference between the predicted angle and the first angle for the respective possible value.

18. The non-transitory computer-readable medium of claim 14, the operations further comprising:

determining, using a machine learning model and antenna measurements of the signal, a probability vector for the first set of possible values, each probability of the probability vector corresponding to a region of a plurality of regions around the mobile device, wherein the confidence score for a respective possible value is determined using the probability in the probability vector for the respective possible value;

measuring a power level of the signal, the power level of the signal being one of the one or more signal values;

comparing the power level of the signal to a threshold power level value, wherein the confidence score for at least one of plurality of possible values is adjusted based on the power level of the signal being below the threshold power level value;

determining a motion of the mobile device over a period of time using the one or more signal values;

for each of the first set of possible values, predicting an angle of the signal at a first time based on the motion;

determining a first angle of the signal at the first time based on one or more additional phase differences measured at the first time, wherein the confidence score for a respective possible value is adjusted based on a difference between the predicted angle and the first angle for the respective possible value;

receiving a second signal by the plurality of antennas, wherein the second signal is transmitted over a second frequency;

measuring one or more second phase differences among the second signal received at the plurality of antennas, wherein the one or more second phase differences are the one or more signal values;

determining a second set of possible values for the angle of arrival that are consistent with the one or more second phase differences; and for each of the first set of possible values, determining a difference between a respective possible value and one of the second set of possible values, wherein the confidence score for the respective possible value is determined based on the difference between the respective possible value and the one of the second set of possible values.

* * * * *